United States Patent [19]

Hayashi et al.

[11] Patent Number: 5,698,249

[45] Date of Patent: Dec. 16, 1997

[54] PACKAGE OF FRESH PLANT

[75] Inventors: Kazuyoshi Hayashi; Koji Shimizu; Noriko Sugawara; Kozo Mita, all of Tokyo, Japan

[73] Assignee: Dai Nippon Printing Co., Ltd., Japan

[21] Appl. No.: 339,745

[22] Filed: Nov. 14, 1994

[30] Foreign Application Priority Data

| Aug. 3, 1994 | [JP] | Japan | 6-202896 |
| Aug. 3, 1994 | [JP] | Japan | 6-202897 |
| Aug. 3, 1994 | [JP] | Japan | 6-202898 |

[51] Int. Cl.⁶ .................................... A23B 7/00
[52] U.S. Cl. .................. 426/106; 426/118; 426/410; 426/415; 426/418; 426/419
[58] Field of Search ................ 426/106, 118, 426/124, 410, 415, 418, 419

[56] References Cited

U.S. PATENT DOCUMENTS

| 3,382,078 | 5/1968 | Melio et al. | 426/415 X |
| 3,393,185 | 7/1968 | Keskkula et al. | 426/415 X |
| 3,450,542 | 6/1969 | Badron | 426/415 X |
| 3,450,543 | 6/1969 | Badron et al. | 426/415 |
| 3,450,544 | 6/1969 | Badron et al. | 426/415 |
| 3,788,333 | 1/1974 | Cummin | 426/415 X |
| 3,795,749 | 3/1974 | Cummin | 426/415 X |
| 4,883,674 | 11/1989 | Fon | 426/106 X |
| 4,923,703 | 5/1990 | Antoon, Jr. | 426/106 X |
| 4,943,440 | 7/1990 | Armstrong | 426/106 X |
| 5,254,401 | 10/1993 | Kelch et al. | 426/127 X |

OTHER PUBLICATIONS

Sakamoto et al., Japanese Abstract 05-316942 Mar. 3, 1994.

Irving, A.R., "Transport of fresh horticultural produce under controlled atmospheres", CSIRO Food Res Q. 44(2), 25-33, 1984.

Rizvi, S.S.H., "Principles of Microatmosphere Packaging", Proc of the International Conf. on Controlled Atmosphere Packaging, 1984, 137-150.

Sonsino, S., "Plastics keeps ripeness under wrap", New Scientist, Aug. 1986, 35-38.

Variono-Marston et al., "Controlled Atmosphere Packaging of Produce" 1987 Produce Marketing Almanac, pp. 23-29.

Primary Examiner—Milton Cano
Attorney, Agent, or Firm—Parkhurst,Wendel & Burr,L.L.P

[57] ABSTRACT

The present invention relates to a technique for packaging fresh plants, by which the freshness of the fresh plants can be retained from the time they are shipped by producers, until the time they are consumed by consumers. By controlling the water vapor permeability, and oxygen and carbonic acid gas transmission rates of a film, a package of fresh plant suitable for non-airtight or airtight packaging, a packaging material useful for such a package, and a method for retaining the freshness of fresh plants are provided.

16 Claims, 1 Drawing Sheet

PACKAGE OF FRESH PLANT

BACKGROUND OF THE INVENTION

The present invention relates to a package of fresh plant. The present invention particularly relates to a package having the excellent properties of retaining the freshness of a fresh plant which has a great respiration volume, and to a material used for preparing the same.

A package obtained by using an inner bag of corrugated fiberboard box made of, for instance, a polyethylene or polypropylene film, by means of non-airtight fold packaging has been utilized as a package which is expected to have the retentivity of the freshness of fresh plants having a relatively great respiration volume, for instance, vegetables and fruits such as broccoli, cauliflower, Japanese apricots and bananas, mushrooms such as shiitake and champignon, and flowering plants such as roses and dayflowers.

The freshness of a fresh plant packed in the above package is retained by the effect of suppressing the transpiration of the fresh plant brought about by the plastic film, and by the MA (modified atmosphere) effect by which the inner system of the package is kept in a low-oxygen, high-carbonic acid gas state, which is attained by the respiration of the fresh plant and the gas transmission rate of the plastic film constituting the inner bag, to suppress the respiration volume of the fresh plant.

For example, in the case of a package of broccoli of the above type, the effect of retaining the green color of the broccoli, and the effect of preventing decrease of the Vitamin C content of the broccoli can be expected.

In a package which is obtained by means of non-airtight fold packaging by the use of the above-described inner bag of corrugated fiberboard box made of a polyethylene or polypropylene film, both the effect of suppressing the transpiration of a fresh plant placed therein, and the MA (modified atmosphere) effect can be expected. However, the water vapor permeability of the inner bag is too low, so that the inside of the inner bag becomes excessively humid due to the transpiration of the fresh plant. For this reason, dew condensation is caused at the circumferential surface of the inner bag, and the fresh plant gets moldy or is corrupted. It is thus the present situation that the inner bag of corrugated fiberboard box makes a fresh plant packed therein lose its freshness.

The present invention is to provide a package which is a preservation form for preventing deterioration in the quality of fresh plants having a great respiration volume, caused during the distribution thereof, and keeping their quality high; a material used for preparing the same; and a method for retaining the freshness of fresh plants.

SUMMARY OF THE INVENTION

The present invention will be explained by dividing it into six groups, groups A to F.
The Invention of Group A The first invention of group A relates to a package of fresh plant obtained by packaging a fresh plant in a bag prepared by using a plastic film having a water vapor permeability at 40° C. and 90 RH % of 50 to 300 g/m²·24 hrs, by means of non-airtight fold packaging, placing the bag containing the fresh plant in a container composed of corrugated fiberboard, and controlling the oxygen concentration in the bag placed in the container to 2 to 10 vol. %.

Further, a packaging film according to the present invention is one which is useful for packaging a fresh plant by means of non-airtight packaging, and which is made of a plastic film having a water vapor permeability at 40° C. and 90 RH % of 50 to 300 g/m²·24 hrs.

Furthermore, an assemblage which is used for packaging and transportation according to the present invention comprises a packaging film made of a plastic film having a water vapor permeability at 40° C. and 90 RH % of 50 to 300 g/m²·24 hrs, and a container in which packages obtained by using the above-described packaging film are placed for transportation.

Furthermore, a method for retaining the freshness of fresh plants according to the present invention comprises packaging a fresh plant in a bag prepared by using a plastic film having a water vapor permeability at 40° C. and 90 RH % of 50 to 300 g/m²·24 hrs by means of non-airtight fold packaging, placing the bag containing the fresh plant in a container composed of corrugated fiberboard, and controlling the oxygen concentration in the bag placed in the container to 2 to 10 vol. %.
The Invention of Group B The present invention of group B relates to a unit package of fresh plant obtained by entirely wrapping a piece of a fresh plant in a plastic film having a water vapor permeability at 40° C. and 90 RH % of 50 to 300 g/m²·24 hrs, turning up or twisting the end portion of the film to obtain a non-airtight package, and controlling the oxygen concentration in the package to 2 to 10 vol. %.

Further, a method for retaining the freshness of fresh plants according to the present invention comprises entirely wrapping a piece of a fresh plant in a plastic film having a water vapor permeability at 40° C. and 90 RH % of 50 to 300 g/m²·24 hrs, turning up or twisting the end portion of the film to obtain a non-airtight package, and controlling the oxygen concentration in the package to 2 to 10 vol. %.
The Invention of Group C The present invention of group C relates to a package of fresh plant having a stalk part and a flower bud part, obtained by wrapping a part of the stalk part and the entire flower bud part of a fresh plant having a stalk part and a flower bud part in a plastic film having a water vapor permeability at 40° C. and 90 RH % of 50 to 300 g/m²·24 hrs, fixing the plastic film at a proper point on the stalk part to obtain a non-airtight package, and controlling the oxygen concentration in the package to 2 to 10 vol. %.

Further, the present invention relates to a method for retaining the freshness of fresh plants having a stalk part and a flower bud part, comprising wrapping a part of the stalk part and the entire flower bud part of a fresh plant having a stalk part and a flower bud part in a plastic film having a water vapor permeability at 40° C. and 90 RH % of 50 to 300 g/m²·24 hrs, fixing the plastic film at a proper point on the stalk part to obtain a non-airtight package, and controlling the oxygen concentration in the package to 2 to 10 vol. %.
The Invention of Group D The present invention of group D relates to a packaging film for retaining the freshness of fresh plants, provided with minute holes having an average diameter of 100 to 300 μm, the oxygen and carbonic acid gas transmission rates of the film being controlled by the area and the number of the minute holes.

In the above film, it is preferable that the oxygen and carbonic acid gas transmission rates at 23° C. of the entire film provided with the minute holes be from 1000 to 100000 cc/m²·24 hrs·atm.
The Invention of Group E The present invention of group E relates to a method for retaining the freshness of broccoli, comprising packaging broccoli in a pouch prepared by using a film provided with minute holes, sealing the pouch, and keeping the oxygen concentration and the carbonic acid gas concentration in the pouch at 3 to 15%, and 6 to 18%, respectively.

It is preferable that the oxygen and carbonic acid gas transmission rates at 23° C. of the above film provided with minute holes be from 10000 to 50000 cc/m$^2$·24 hrs·atm.

Further, a package of broccoli according to this embodiment is obtained by packaging broccoli in a pouch prepared by using a film provided with minute holes, sealing the pouch, and keeping the oxygen concentration and the carbonic acid gas concentration in the pouch at 3 to 15%, and 6 to 18%, respectively.

The Invention of Group F

The present invention of group F relates to a packaging bag for mushrooms, made of a film capable of being sealed, in which the film has an oxygen transmission rate at 23° C. of 3000 to 30000 cc/m$^2$·24 hrs·atm, and a water vapor permeability at 40° C. of 50 to 200 g/m$^2$·24 hrs·atm.

Methods of Measurements

The above-described water vapor permeability, oxygen transmission rate and carbonic acid gas transmission rate in the present invention are the ones measured by the following methods:

Water vapor permeability: the method in accordance with JIS Z0208

Oxygen and carbonic acid gas transmission rates: the method in accordance with JIS K7126

BEST MODE FOR CARRYING OUT THE INVENTION

The Invention of Group A

Figure 1:
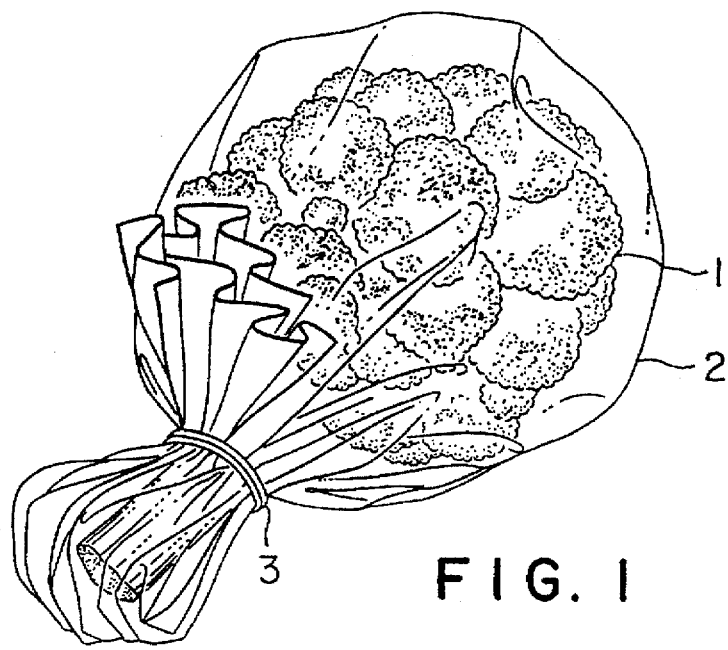
FIG. 1 is an illustration showing one example of the unit package of fresh plant (broccoli) according to the present invention (the invention of group B)

A package of fresh plant according to the present invention shows the excellent properties of retaining the freshness of a fresh plant packed therein by the effect of suppressing the transpiration of the fresh plant, by the MA (modified atmosphere) effect, and by the effect of preventing the inside of an inner bag from becoming excessively humid because of the transpiration of the fresh plant.

We confirmed that the gas transmission rate of the plastic film itself constituting the inner bag of corrugated fiberboard box is almost negligible in obtaining the MA (modified atmosphere) effect by which the inner system of the package is kept in a low-oxygen, high-carbonic acid gas state to suppress the respiration of a fresh plant placed in the inner bag; that an oxygen concentration sufficient to obtain the MA (modified atmosphere) effect can be attained in the inner bag of corrugated fiberboard box by gas which passes through the folded portion of the inner bag, the folding being done to obtain a non-airtight package; and that with respect to the permeation of water vapor generated by the transpiration of the fresh plant placed in the inner bag, the water vapor permeation through the folded portion of the inner bag is negligible, and it depends on the water vapor permeability of the plastic film constituting the inner bag of corrugated fiberboard box. The present invention has been accomplished based on these findings.

In the package of fresh plant according to the present invention, having the above-described structure, a plastic film having a water vapor permeability at 40° C. and 90 RH % of 50 to 300 g/m$^2$·24 hrs, more preferably 100 to 200 g/m$^2$·24 hrs is used as the plastic film for the inner bag of corrugated fiberboard box, which is closed by folding without sealing. When the water vapor permeability at 40° C. and 90 RH % of the plastic film is less than 50 g/m$^2$·24 hrs, the inside of the inner back closed by folding without sealing becomes excessively humid due to the transpiration of the fresh plant packed therein. As a result, the fresh plant readily gets moldy, or is readily softened or corrupted. On the other hand, when the water vapor permeability at 40° C. and 90 RH % of this plastic film is in excess of 300 g/m$^2$·24 hrs, the effect of suppressing the transpiration of the fresh plant placed in the inner bag is reduced. As a result, the fresh plant easily withers.

Further, in the package of fresh plant according to the present invention, it is necessary to control the oxygen concentration in the inner bag of corrugated fiberboard box, made of a plastic film having a water vapor permeability at 40° C. and 90 RH % of 50 to 300 g/m$^2$·24 hrs, in which a fresh plant is packed by means of non-airtight fold packaging, to 2 to 10 vol. %. When the oxygen concentration in the inner bag is less than 2 vol. %, a fresh plant placed in the bag respires anaerobically because gas surrounding the fresh plant has a low oxygen concentration. As a result, the fresh plant emits an offensive odor. On the other hand, when the oxygen concentration in the inner bag is in excess of 10 vol. %, only a small MA (modified atmosphere) effect can be obtained, and, for instance, in the case of a package of broccoli, such a trouble that the broccoli yellows soon is caused.

Therefore, by controlling the oxygen concentration in the inner bag of corrugated fiberboard box, made of a plastic film, in which a fresh plant is packed by means of non-airtight fold packaging, to 2 to 10 vol. %, the MA (modified atmosphere) effect by which the inner system of the package can be kept in a low-oxygen, high-carbonic acid gas state to suppress the respiration of the fresh plant can be obtained.

Specific examples of the plastic film used for preparing the inner bag of corrugated fiberboard box to be closed by folding without sealing, employed in the package of fresh plant according to the present invention, include films containing as a main component polystyrene. In particular, a plastic film containing 50 to 100% by weight, preferably 70 to 100% by weight of a styrene-butadiene block copolymer is suitable. This is because such a film has excellent properties in the mechanical strength of the film itself, heat-sealing strength at sealed portions, transparency and film-forming properties.

Polystyrene resins for forming a plastic film which is used for preparing the inner bag of corrugated fiberboard box to be closed by folding without sealing are, for example, general-purpose polystyrene (GPPS), high-impact polystyrene (HIPS), styrene-butadiene block copolymers, styrene-butadiene elastomers, and blends thereof.

It is, of course, possible to add an anti-fogging agent, an anti-blocking agent or the like, if necessary, when the plastic film used for preparing this inner bag of corrugated fiberboard box is prepared by molding. In addition, in order to improve the film-forming properties, it is also possible to add, for example, a butadiene resin or the like within such a range that the amount of the resin does not exceed 50% by weight of the total weight of all the resins used.

The plastic film used for preparing the inner bag of corrugated fiberboard box may be obtained by any conventionally known molding method such as the inflation method or the T-die method. It is noted that there is no particular limitation on the thickness of the plastic film as long as the film has a water vapor permeability at 40° C. and 90 RH % of 50 to 300 g/m$^2$·24 hrs. For example, a film obtained from a styrene-butadiene block copolymer, having a thickness of 30 μm, has a water vapor permeability at 40° C. and 90 RH % of 100 to 200 g/m$^2$·24 hrs; this film is suitable as the plastic film used for preparing the inner bag of corrugated fiberboard box employed in the package according to the present invention.

In the package of fresh plant according to the present invention, a fresh plant is packed in the inner bag of corrugated fiberboard box by means of non-airtight fold packaging. This packaging may be conducted in a manner in which a pouch prepared by using the plastic film, with the three sides thereof sealed, is placed in a corrugated fiberboard box, a predetermined fresh plant is placed in the pouch through the upper opening of the pouch, and the upper opening of the pouch is then folded to close the pouch; or a manner in which a sufficiently large-sized plastic film is spread in a corrugated fiberboard box, a predetermined fresh plant is placed on the plastic film, and the end portions of the plastic film are folded to pack the fresh plant.

The package of fresh plant according to the present invention has the MA (modified atmosphere) effect by which the inner system of the package is kept in a low-oxygen, high-carbonic acid gas state to suppress the respiration of the fresh plant packed therein. Moreover, this package is particularly useful as a package of fresh plant whose transpiration caused by the respiration thereof is active, for example, vegetables and fruits such as broccoli, cauliflower, unripe plums, kabosu, sudachi, spinach, bean sprouts, green soybeans, corns and bannas; cut vegetables such as cut lettuce and cut cabbage; mushrooms such as shiitake and champignon; and flowering plants such as roses and dayflowers. However, the package of the present invention is not limited to these fresh plants.

In the package of fresh plant according to the present invention, a fresh plant is packed, by means of non-airtight fold packaging, in an inner bag of corrugated fiberboard box, made of a plastic film having a water vapor permeability at 40° C. and 90 RH % of 50 to 300 g/m$^2$·24 hrs, and the oxygen concentration in the inner bag is controlled to 2 to 10 vol. %.

Therefore, in the package of fresh plant according to the present invention, the effect of suppressing the transpiration of the fresh plant packed therein, the MA (modified atmosphere) effect by which the inner system of the package is kept in a low-oxygen, high-carbonic acid gas state to suppress the respiration of the fresh plant, and the effect of preventing the inner bag of corrugated fiberboard box from becoming excessively humid due to the transpiration of the fresh plant are well balanced. For this reason, it is very useful as a package having the MA (modified atmosphere) effect by which the inner system of the package is kept in a low-oxygen and high-carbonic acid gas state to suppress the respiration of a fresh plant packed therein, and capable of effectively retaining the freshness of the fresh plant whose transpiration due to the respiration thereof is active.

The Invention of Group B

The present invention of group B is to provide, as a package having the excellent properties of retaining the freshness of a fresh plant packed therein from the time it is shipped by a producer, until the time it is consumed by a consumer, a unit package of fresh plant obtained by using a plastic film having specific properties, the oxygen concentration in the package obtained by using the plastic film being kept in a specific range.

In the conventional package employing an inner bag of corrugated fiberboard box made of a polyethylene or polypropylene film, obtained by means of non-airtight packaging, both the effect of suppressing the transpiration of a fresh plant packed in the inner bag and the MA (modified atmosphere) effect can be expected. However, since the water vapor permeability of this inner bag is too low, the inside of the inner bag becomes excessively humid because of the transpiration of the fresh plant. For this reason, dew condensation is caused at the circumferential surface of the inner bag. As a result, the fresh plant placed in the inner bag gets moldy or is corrugated. It is thus the present situation that a fresh plant placed in such an inner bag of corrugated fiberboard box loses its freshness.

Further, in the above-described package employing an inner bag of corrugated fiberboard box made of a polyethylene or polypropylene film, obtained by means of non-airtight packaging, the effect of retaining the freshness of a fresh plant placed in the inner bag can be expected only during the distribution of the fresh plant, that is, from the time it is shipped, until the time it is displayed on a shop counter, and the retention of the freshness of the fresh plant from the time it is displayed on the shop counter, until the time it is consumed by a consumer cannot be expected.

Furthermore, there has been almost no package of fresh plant which can retain the freshness of a fresh plant packed therein from the time it is displayed on a shop counter, until the time it is consumed. In particular, there has been no package of fresh plant which can retain the freshness of a fresh plant packed therein from the time it is shipped by a producer, until the time it is consumed by a consumer.

Unit packages in which a fresh plant is packed with a polyethylene or polypropylene film have been sold to consumers. However, such packages are made in order to improve the appearance thereof, to make the packages more beautiful, and to obtain the effect of suppressing the transpiration of the fresh plant, and there has been no unit package of fresh plant which has the properties of retaining the freshness of a fresh plant packed therein by utilizing both the so-called MA effect and the effect of properly suppressing the transpiration of the fresh plant.

The present invention is to provide a unit package of fresh plant as a preservation form capable of preventing deterioration in the quality of the above-described fresh plant packed therein which has a great respiration volume, and of retaining the freshness of the fresh plant from the time it is shipped by a producer, until the time it is consumed by a consumer.

According to the present invention, the above object can be attained by a unit package of fresh plant which is obtained by entirely wrapping a piece of a fresh plant in a plastic film having a water vapor permeability at 40° C. and 90 RH % of 50 to 300 g/m$^2$·24 hrs, turning up or twisting the end portion of the plastic film to obtain a non-airtight package, and controlling the oxygen concentration in the package to 2 to 10 vol. %.

The unit package of fresh plant according to the present invention has the excellent properties of retaining the freshness of a fresh plant packed therein by the effect of suppressing the transpiration of the fresh plant, by the MA (modified atmosphere) effect, and by the effect of preventing the inside of the package from becoming excessively humid due to the transpiration of the fresh plant.

We confirmed that the gas transmission rate of the plastic film itself constituting the packaging bag is almost negligible in obtaining the MA (modified atmosphere) effect by which the inner system of the package is kept in a low-oxygen, high-carbonic acid gas state to suppress the respiration of a fresh plant placed in the bag; that an oxygen concentration sufficient to obtain the MA (modified atmosphere) effect can be attained in the packaging bag by gas which passes through the turned up or twisted portion of the package, the turning up or twisting being done in order to obtain an airtight package; and that with respect to the permeation of water vapor generated by the transpiration of the fresh plant placed in the packaging bag, the water vapor permeation through the turned up or twisted portion of the package can be neglected, and it depends on the water vapor permeability of the plastic film constituting the packaging bag. The present invention has been accomplished based on these findings.

In the unit package of fresh plant according to the present invention, having the above-described structure, a plastic film having a water vapor permeability at 40° C. and 90 RH % of 50 to 300 g/m$^2$·24 hrs, more preferably 100 to 200 g/m$^2$·24 hrs is used as the plastic film employed for entirely wrapping a piece of a fresh plant. When the water vapor permeability at 40° C. and 90 RH % of the plastic film is less than 50 g/m$^2$·24 hrs, the inside of the package obtained by means of non-airtight turning-up or twist packaging becomes excessively humid because of the transpiration of a fresh plant packed therein. As a result, the fresh plant readily gets moldy, or is readily softened or corrugated. On the other hand, when the water vapor permeability at 40° C. and 90 RH % of this plastic film is in excess of 300 g/m$^2$·24 hrs, the effect of suppressing the transpiration of the fresh plant packed in the package is reduced. As a result, the fresh plant easily withers.

Further, in the unit package of fresh plant according to the present invention, it is necessary to control the oxygen concentration in the package, which is obtained by entirely wrapping a piece of a fresh plant in a plastic film having a water vapor permeability at 40° C. and 90 RH % of 50 to 300 g/m$^2$·24 hrs and turning up or twisting the end portion of the plastic film in order to obtain a non-airtight package, to 2 to 10 vol. %. When the oxygen concentration in this package is less than 2 vol. %, the fresh plant packed therein respires anaerobically because gas surrounding the fresh plant has a low oxygen concentration. As a result, the fresh plant emits an offensive odor. On the other hand, when the oxygen concentration in the package is in excess of 10 vol. %, only a small MA (modified atmosphere) effect can be obtained, and, for instance, in the case of a unit package of broccoli, such as trouble that the broccoli yellows soon is caused.

Therefore, by controlling the oxygen concentration in the package, which is obtained by entirely wrapping a piece of a fresh plant in a plastic film and turning up or twisting the end portion of the plastic film to obtain a non-airtight package, to 2 to 10 vol. %, the MA (modified atmosphere) effect by which the inner system of the package can be kept in a low-oxygen, high-carbonic acid gas state to suppress the respiration of the fresh plant placed in the package can be obtained.

Preferably, the unit package is such that a piece of a fresh plant 1 is entirely wrapped in a plastic film 3 which is then turn up, and the turned portion is fixed by means of bag sealing (banding) using tape 3 or a rubber band as shown in FIG. 1. In the case of twist packaging, the twisted portion of the film is preferably fixed by means of bag sealing (banding) using tape or a rubber band.

Specific examples of the plastic film which is used to entirely wrap a piece of a fresh plant in the unit package of fresh plant according to the present invention include films containing as a main component polystyrene. In particular, a plastic film containing 50 to 100% by weight, preferably 70 to 100% by weight of a styrene-butadiene block copolymer is suitable. This is because such a film has excellent properties in the mechanical strength of the film itself, heat-sealing strength at sealed portions, transparency and film-forming properties.

Polystyrene resins which can be used for forming a plastic film used to entirely wrap a piece of a fresh plant are, for example, general-purpose polystyrene (GPPS), high-impact polystyrene (HIPS), styrene-butadiene block copolymers, styrene-butadiene elastomers, and blends thereof.

It is, of course, possible to add an anti-fogging agent, an anti-blocking agent or the like, if necessary, when the plastic film used to entirely wrap a piece of a fresh plant is prepared by molding. In addition, in order to improve the film-forming properties, it is also possible to add, for example, a butadiene resin or the like within such a range that the amount of the resin does not exceed 50% by weight of the total weight of all the resins used.

This plastic film may be obtained by any conventionally known molding method such as the inflation or T-die method. It is noted that there is no particular limitation on the thickness of the plastic film as long as the film has a water vapor permeability at 40° C. and 90 RH % of 50 to 300 g/m$^2$·24 hrs. For example, a film obtained from a styrene-butadiene block copolymer, having a thickness of 30 µm, has a water vapor permeability at 40° C. and 90 RH % of 100 to 200 g/m$^2$·24 hrs; this film is suitable as the plastic film used for the unit package of fresh plant according to the present invention.

The unit package of fresh plant according to the present invention is such that the end portion of a plastic film in which a piece of a fresh plant is wrapped is turned up or twisted to obtain a non-airtight package. This package may be obtained in a manner in which the opening of a pouch prepared by using a plastic film, with the three sides thereof sealed, is closed by turning up or twisting the film; or a manner in which a sufficiently large-sized plastic film is spread, a piece of a predetermined fresh plant is placed on and entirely wrapped in the plastic film, and the end portion of the plastic film is twisted to obtain a package.

The unit package of fresh plant according to the present invention has the MA (modified atmosphere) effect by which the inner system of the package is kept in a low-oxygen, high-carbonic acid gas state to suppress the respiration of a fresh plant packed therein. Moreover, this package is particularly useful as a package of fresh plant whose transpiration caused by the respiration thereof is active, for example, vegetables and fruits such as broccoli, cauliflower, unripe plums, kabosu, sudachi, spinach, bean sprouts, green soybeans, corns and bannas; cut vegetables such as cut lettuce and cut cabbage; mushrooms such as shiitake and champignon; and flowering plants such as roses and day-flowers. However, the unit package of fresh plant according to the present invention is not limited to these fresh plants.

In the unit package of fresh plant according to the present invention, a piece of a fresh plant is entirely wrapped in a plastic film having a water vapor permeability at 40° C. and 90 RH % of 50 to 300 g/m²·24 hrs, the end portion of the film is turned up or twisted to obtain a non-airtight package, and the oxygen concentration in the package is controlled to 2 to 10 vol. %.

Therefore, in the unit package of fresh plant according to the present invention, the effect of suppressing the transpiration of a fresh plant packed therein, the MA (modified atmosphere) effect by which the inner system of the package is kept in a low-oxygen, high-carbonic acid gas state to suppress the respiration of the fresh plant, and the effect of preventing the inside of the package from becoming excessively humid due to the transpiration of the fresh plant are well balanced. For this reason, the unit package of the invention is very useful as a package having the MA (modified atmosphere) effect by which the inner system of the package is kept in a low-oxygen, high-carbonic acid gas state to suppress the respiration of a fresh plant packed therein, and capable of effectively retaining the freshness of the fresh plant whose transpiration due to the respiration thereof is active.

The Invention of Group C

The present invention is to provide a package of fresh plant having a stalk part and a flower bud part, which is a preservation form capable of retaining the freshness of a fresh plant having a stalk part and a flower bud part from the time it is shipped, until the time it is consumed by a consumer.

The package of fresh plant having a stalk part and a flower bud part according to the present invention is obtained by wrapping a part of the stalk part and the entire flower bud part of a fresh plant having a stalk part and a flower bud part in a plastic film having a water vapor permeability at 40° C. and 90 RH % of 50 to 300 g/m²·24 hrs, fixing the plastic film at a proper point on the stalk part of the fresh plant to obtain a non-airtight package, and controlling the oxygen concentration in the package to 2 to 10 vol. %.

The package of fresh plant having a stalk part and a flower bud part according to the present invention has the excellent properties of retaining the freshness of a fresh plant packed therein by the effect of suppressing the transpiration of the fresh plant, by the MA (modified atmosphere) effect, and by the effect of preventing the inside of the package from becoming excessively humid due to the transpiration of the fresh plant.

We confirmed that the gas transmission rate of a plastic film itself in which a fresh plant is wrapped is almost negligible in obtaining the MA (modified atmosphere) effect by which the inner system of the package is kept in a low-oxygen, high-carbonic acid gas state to suppress the respiration of the fresh plant; that an oxygen concentration sufficient to obtain the MA (modified atmosphere) effect can be attained in the package by gas which passes through the non-sealed portion of the package; that with respect to the permeation of water vapor generated by the transpiration of the fresh plant packed in the packaging bag, the water vapor permeation through the non-sealed portion of the package is negligible and it depends on the water vapor permeability of the plastic film constituting the packaging bag; and that the ME effect of a fresh plant having a stalk part and a flower bud part can be sufficiently obtained even by packaging only the flower bud part. The present invention has been accomplished based on these findings.

In the package of fresh plant having a stalk part and a flower bud part according to the present invention, having the above-described structure, a plastic film having a water vapor permeability at 40° C. and 90 RH % of 50 to 300 g/m²·24 hrs, more preferably 100 to 200 g/m²·24 hrs is used as the plastic film employed for partly wrapping the stalk part and entirely wrapping the flower bud part of the fresh plant. When the water vapor permeability at 40° C. and 90 RH % of the plastic film is less than 50 g/m²·24 hrs, the inside of the non-airtight package obtained by using the plastic film becomes excessively humid due to the transpiration of the flower bud part of a fresh plant packed therein. As a result, the flower bud part of the fresh plant readily gets moldy, or is readily softened or corrupted. On the other hand, when the water vapor permeability at 40° C. and 90 RH % of this plastic film is in excess of 300 g/m²·24 hrs, the effect of suppressing the transpiration of a fresh plant packed in the non-airtight package is reduced. As a result, the fresh plant easily withers.

Further, in the package of fresh plant having a stalk part and a flower bud part according to the present invention, it is necessary to control the oxygen concentration in the package which is obtained by partly wrapping the stalk part and entirely wrapping the flower bud part of the fresh plant packed in the above-described plastic film, and fixing the plastic film at a proper point on the stalk part, to 2 to 10 vol. %.

When the oxygen concentration in the package obtained by using the plastic film is less than 2 vol. %, a fresh plant packed therein respires anaerobically because gas surrounding the fresh plant has a low oxygen concentration. As a result, the fresh plant emits an offensive odor. On the other hand, when the oxygen concentration in the package is in excess of 10 vol. %, only a small MA (modified atmosphere) effect can be obtained, and, for instance, in the case of a package of broccoli, such a trouble that the broccoli yellows soon is caused.

Therefore, by controlling the oxygen concentration in the package, which is obtained by partly wrapping the stalk part and entirely wrapping the flower bud part of a fresh plant having a stalk part and a flower bud part, and fixing the plastic film at a proper point on the stalk part of the fresh plant to obtain a non-airtight package, to 2 to 10 vol. %, the MA (modified atmosphere) effect by which the inner system of the package can be kept in a low-oxygen, high-carbonic acid state to suppress the respiration of the fresh plant can be obtained.

Figure 2:
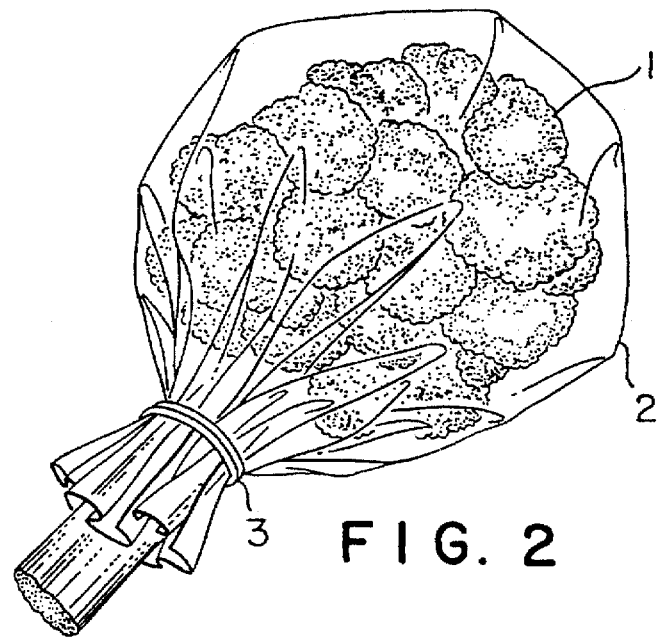
FIG. 2 is an illustration showing one example of the package of fresh plant (broccoli) having a stalk part and a flower bud part according to the present invention (the invention of group C)

The package of fresh plant having a stalk part and a flower bud part is obtained by wrapping a part of the stalk part and the entire flower bud part of a fresh plant 1 in a plastic film 2 having a water vapor permeability at 40° C. and 90 RH % of 50 to 300 g/m²·24 hrs, and fixing the plastic film 2 at a proper point on the stalk part of the fresh plant 1 by means of bag sealing (banding) using tape or a rubber band 3 as shown in FIG. 2 to obtain a non-airtight package.

Specific examples of the plastic film which is used to wrap a fresh plant, in the package of fresh plant having a stalk part and a flower bud part according to the present invention include films containing as a main component polystyrene. In particular, a plastic film containing 50 to 100% by weight, preferably 70 to 100% by weight of a styrene-butadiene block copolymer is suitable. This is because such a film has excellent properties in the mechanical strength of the film itself, heat-sealing strength at sealed portions, transparency and film-forming properties.

Polystyrene resins which can be used for forming a plastic film used to wrap the above fresh plant are, for example, general-purpose polystyrene (GPPS), high-impact polystyrene (HIPS), styrene-butadiene block copolymers, styrene-butadiene elastomers, and blends thereof.

It is, of course, possible to add an anti-fogging agent, an anti-blocking agent or the like, if necessary, when this plastic film used to wrap the fresh plant is prepared by molding. In addition, in order to improve the film-forming properties, it is also possible to add, for example, a butadiene resin or the like within such a range that the amount of the resin does not exceed 50% by weight of the total weight of all the resins used.

This plastic film may be obtained by any conventionally known molding method such as the inflation method or the T-die method. It is noted that there is no particular limitation on the thickness of the plastic film as long as the film has a water vapor permeability at 40° C. and 90 RH % of 50 to 300 g/m$^2$·24 hrs. For example, a film obtained from a styrene-butadiene block copolymer, having a thickness of 30 µm, has a water vapor permeability at 40° C. and 90 RH% of 100 to 200 g/m$^2$·24 hrs; this film is suitable as the plastic film used for a unit package of fresh plant having a stalk part and a flower bud part according to the present invention.

The package of fresh plant having a stalk part and a flower bud part according to the present invention is such that the stalk part of a fresh plant is partly and the flower bud part thereof is entirely wrapped in a plastic film without sealing. This package may be obtained in a manner in which the opening of a pouch made of a plastic film, with the three sides thereof sealed, is fixed without sealing at a proper point on the stalk part by means of bag seal (banding) using tape or a rubber band; or a manner in which a sufficiently large-sized plastic film is spread, a piece of a predetermined fresh plant is placed on the plastic film and the flower bud part of the plant is entirely wrapped in the film, and the end portion of the plastic film is fixed at a proper point on the stalk part of the fresh plant by means of bag sealing (banding) using tape or a rubber band.

The package of fresh plant having a stalk part and a flower bud part according to the present invention has the MA (modified atmosphere) effect by which the inner system of the package is kept in a low-oxygen, high-carbonic acid gas state to suppress the respiration of a fresh plant packed therein. Moreover, this package is particularly useful as a package of fresh plant whose transpiration due to the respiration thereof is active, such as broccoli and cauliflower. However, the package of fresh plant having a stalk part and a flower bud part according to the present invention is not limited to these fresh plants.

In the package of fresh plant having a stalk part and a flower bud part according to the present invention, the stalk part of a fresh plant having a stalk part and a flower bud part is partly and the flower bud part thereof is entirely wrapped in a plastic film having a water vapor permeability at 40° C. and 90 RH % of 50 to 300 g/m$^2$·24 hrs, the film is fixed at a proper point on the stalk part of the fresh plant to form a non-airtight package, and the oxygen concentration in the package is controlled to 2 to 10 vol. %.

Therefore, in the package of fresh plant according to the present invention, the effect of suppressing the transpiration of the flower bud part of a fresh plant packed therein, the MA (modified atmosphere) effect by which the inner system of the package of the flower bud part is kept in a low-oxygen, high-carbonic acid gas state to suppress the respiration of the fresh plant, and the effect of preventing the inside of the package from becoming excessively humid due to the transpiration of the flower bud part of the fresh plant are well balanced. For this reason, it is very useful as a package having the MA (modified atmosphere) effect by which the inner system of the package is kept in a low-oxygen, high-carbonic acid gas state to suppress the respiration of a fresh plant packed therein, and capable of effectively retaining the freshness of a fresh plant whose transpiration due to the respiration thereof is active.

The Invention of Group D

The present invention in this embodiment relates to a freshness-retaining packaging film capable of preventing flowering plants, fruits and vegetables from losing their freshness. More specifically, the present invention relates to a freshness-retaining packaging film which is useful for the airtight packaging of vegetables and fruits and for keeping a gas composition in the inner system of the package proper.

The method in which the composition of gas surrounding vegetable or fruit is changed has been usually employed as a method for preventing vegetables and fruits from losing their freshness. This method is practically used as CA (controlled atmosphere) preservation when apples are stored for a prolonged period of time. Further, so-called MA (modified atmosphere) preservation is also widely practiced, in which the inside of a package is kept in a low-oxygen, high-carbonic acid gas state by utilizing airtight packaging attained by using a plastic film and the respiration of vegetable or fruit packed therein. In this case, in order to keep the composition of gas in the package proper, it is essential to select a film having proper oxygen and carbonic acid gas transmission rates depending upon the respiration volume of vegetable or fruit to be packed therewith.

Conventional methods for controlling the oxygen and carbonic acid gas transmission rates of a film are of the following three types:

(1) To select a film material having a proper gas transmission rate;

(2) To control the gas transmission rate by changing the thickness of a film; and (3) To control the gas transmission rate by providing holes in a film.

The method (1) is to select proper oxygen and carbonic acid gas transmission rates by utilizing the oxygen and carbonic acid gas transmission rates inherent in a film material. For example, in the case of a film of polyethylene which is the most typical thermoplastic resin, the oxygen transmission rate at 23° C. of the film is from 5000 to 8000 cc/m$^2$·24 hrs·atm when the film has a thickness of 30 µm. In the case of a biaxially-oriented polypropylene film having the same thickness as the above, the oxygen permeability at 23° C. of the film is from 1000 to 3000 cc/m$^2$·24 hrs·atm. It is thus possible to control oxygen and carbonic acid gas transmission rates by changing the film material.

The method (2) utilizes the fact that the gas transmission rate of a film is in inverse proportion to the thickness thereof. It is possible to obtain a wide range of gas transmission rates by simply changing the thickness of a film without changing the film material.

The method (3) is a technique in which minute holes are provided in a film to control the gas transmission rate thereof by the diameter and the number of the minute holes provided. A film which is provided with 10–100 pieces/m$^2$ of holes having an average diameter of 20 to 100 µm, and whose oxygen transmission rate at 25° C. and 75 RH % can be controlled in the range of 200000 cc/m$^2$·24 hrs·atm or less is proposed in Japanese Laid-Open Patent Publications Nos. 73831/1990 and 85181/1990.

However, the above conventional methods (1) and (2) have a shortcoming in that the material and the thickness of a film which can be used are limited, so that the printability, stiffness, strength and sealing properties inherent in the film material cannot be fully utilized. It is therefore the present situation that these methods are of no practical use. In addition, when a laminated film is used in the above method (1) or (2), the range of selection of the oxygen transmission rate becomes narrower. In general, a gas transmission rate suitable for the MA packaging of vegetables and fruits is, in almost all cases, in the range of 1000 to 100000 cc/m²·24 hrs·atm when indicated by the oxygen transmission rate at 23° C. On the other hand, in the case of an ordinary laminated film, a material having a relatively low oxygen transmission rate such as an oriented polypropylene, polyamide or polyethylene terephthalate film is often used as the substrate thereof. Such a laminated film has an oxygen transmission rate at 23° C. of 1000 cc/m²·24 hrs·atm or less, and is thus unsuitable as a film for the MA packaging of vegetables and fruits.

Further, in the case of a film for the MA packaging of vegetables and fruits having an extremely great respiration volume, such as unripe plums, broccoli and mushrooms, the oxygen concentration in a packaging bag is rapidly decreased when the oxygen transmission rate of the film is insufficient. As a result, a respiration trouble is caused, and the content of the package emits an offensive odor or undergoes some other troubles, and loses its commercial value. In the case of the MA packaging of the above vegetables and fruits, there is a case where the film is required to have an oxygen transmission rate at 23° C. of 15000 cc/m²·24 hrs·atm or more. However, it is difficult to obtain an oxygen transmission rate as high as the above by the above-described method (1) or (2). Even an ethylene-vinylacetate copolymer film or a polybutadiene film, which is a film material having a relatively high oxygen transmission rate, has an oxygen transmission rate at 23° C. of 15000 cc/m²·24 hrs·atm or less when calculated in 30 µm thick equivalent. Therefore, there is a possibility that a respiration trouble is caused because of a lack of oxygen inside the packaging bag while the package is being transported at high temperatures during the summer season.

On the other hand, the technique (3) is a method basically applicable to every type of packaging materials. It is clear that the technique (3) is superior to the methods (1) and (2) in that it can be conducted regardless of the material or structure of a film, or whether printing is conducted or not. However, in the methods proposed in Japanese Laid-Open Patent Publications Nos. 73831/1990 and 85181/1990, the average diameter of the holes provided in a film is 20 to 100 µm. When the holes have such a diameter, they are readily clogged with fine wastes of vegetable or fruit when it is tightly packed with the film, so that it is difficult to accurately control the oxygen and carbonic acid gas transmission rates of the film. In addition, various fine wastes such as dusts and film wastes are also produced when holes are provided in the film. These wastes also clog the holes to make it difficult to accurately control the oxygen and carbonic acid gas transmission rates.

Further, when holes have a diameter of 100 µm or less, they are clogged with a printing ink when printing is conducted after the holes are provided, so that they cannot show their effects. Holes are not always provided in a film after lamination or printing is conducted. When printing or an anti-fogging treatment is conducted after holes are provided, the holes are clogged and the diameter thereof is inevitably changed when they have a diameter of 100 µm or less. It is thus impossible to accurately control the oxygen and carbonic acid gas transmission rates. Moreover, it is necessary to use an optical means such as a laser to provide uniform holes having an average diameter of 100 µm or less under the present technical situation, so that the processing cost is increased. When a physical means, for example, a means using a heated needle is employed to provide holes in a film, it is difficult to control the diameter of the holes within the range of 100 µm or less. However, such a means is advantageous from the viewpoint of the processing cost.

Furthermore, those vegetables and fruits which have a great respiration volume also emit a large amount of water vapor at the same time. When such vegetable or fruit is tightly packed with a film in order to attain the MA packaging, the humidity in the packaging bag becomes excessively high, so that dew condensation is caused and waterdrops are deposited on the inner surface of the packaging bag. Such an excess amount of water becomes a hot bed of mold and corruption, and becomes a chief cause that the content of the package loses its freshness. Although it is possible to control the oxygen and carbonic acid gas transmission rates by providing minute holes in a film as described above, it is difficult to control the water vapor permeability at the same time. It has been found by our experiments that the water vapor permeability of a film mostly depends upon the film material itself.

For this reason, it is necessary to use a film material having a proper water vapor permeability in order to prevent the above-described excessively high humidity. However, a polyethylene or polypropylene film, which is usually used for the packaging of vegetables and fruits, has a water vapor permeability at 40° C. and 90 RH % of 30 g/m²·24 hrs or less when the film has a thickness of approximately 30 µm, which is an ordinarily used thickness. Therefore, it is unavoidable that vegetable or fruit packed with such a film gets moldy or is corrupted due to the excessively high humidity. Further, there is also a film whose water vapor permeability is controlled by a large number of holes having a diameter of 0.5 mm or more provided in order to increase the water vapor permeability of the film. However, it is impossible to control the oxygen and carbonic acid gas transmission rates of this film, so that the film cannot be used for the MA packaging.

The present invention is to solve the aforementioned problems in the prior art, and to provide a freshness-retaining packaging film which is used to obtain an airtight package of vegetables and fruits and to keep the composition of gas in the package proper.

We have made earnest studies in order to solve the above-described problems in the prior art, and, as a result, found that when minute holes having an average diameter of 100 to 300 µm are provided in a film, the oxygen and carbonic acid gas transmission rates can be controlled by the area and the number of the minute holes, and a packaging film for retaining the freshness of vegetables and fruits, of which minute holes are not clogged with fine wastes of vegetables and fruits or fine dusts produced when the minute holes are provided can be obtained, and that it is possible to prevent vegetables and fruits from getting moldy or being corrupted and to retain their freshness for a prolonged period of time by selecting a film material having a proper water vapor permeability. The present invention has been accomplished on the basis of these findings.

The packaging film for retaining the freshness of vegetables and fruits according to the present invention is provided with minute holes having an average diameter of 100 to 300 µm. The oxygen and carbonic acid gas transmission rates of the film depend on the diameter and the number of the minute holes provided, that is, the area of the minutes holes. According to our experiments, the oxygen and carbonic acid gas transmission rates per minute hole are from 100 to 900 cc/m²·24 hrs·atm. This means that the transmission amounts of oxygen and carbonic acid gas which pass through the minute hole are equal, and that they are in proportional to the hole area. For instance, it has been made clear by our experiments that the oxygen and carbonic acid gas transmission rates per minute hole are approximately 100 cc/m²·24 hrs·atm when the minute holes have an average diameter of 100 μm. Therefore, the oxygen transmission rate of the film can be controlled by changing the number of the holes per centiate.

In the present invention, the average diameter of the minute holes is important. When the average diameter of the holes is 300 μm or more, the oxygen and carbonic acid gas transmission rates per minute hole are 900 cc/m²·24 hrs·atm or more. It is thus difficult to control the oxygen and carbonic acid gas transmission rates of the film to the ones suitable for the MA preservation of vegetables and fruits. On the other hand, when the average diameter of the minute holes is 100 μm or less, the holes are readily clogged, as described previously, with fine wastes of vegetable or fruit produced when it is packed with the film. It is thus difficult to accurately control the oxygen and carbonic acid gas transmission rates. Moreover, when the minute holes are provided in a film, various wastes such as dusts and film wastes are produced. These wastes also clog the holes to make it difficult to accurately control the oxygen and carbonic acid gas transmission rates.

Further, when the minute holes have a diameter of 100 μm or less, they are clogged with a printing ink when printing is conducted after the holes are provided in a film, and the effects of the minute holes cannot be obtained. Holes are not always provided after lamination or printing is conducted. When printing or an anti-fogging treatment is conducted after holes are provided, the holes are clogged and the diameter thereof is inevitably changed when their diameter is 100 μm or less. It is thus impossible to accurately control the oxygen and carbonic acid gas transmission rates. In addition, it is necessary to use an optical means such as a laser to provide uniform holes having an average diameter of 100 μm or less under the present technical situation, so that the processing cost is increased. When a physical means, for example, a means using a heated needle is employed to provide holes, it is difficult to control the diameter of the holes within the range of 100 μm or less. However, such a means is advantageous from the viewpoint of the processing cost. For this reason, it is an essential requirement in the present invention that the average diameter of the minute holes is from 100 to 300 μm.

In the present invention, the holes have either a circular or oval shape depending upon both the method and the speed of hole processing. In particular, when a physical method, for example, a method using a heated needle, is employed to provide holes in a film, the shape of the holes tends to be oval because the needle and the film are in contact for a long time. Even in such a case, the very same effects can be obtained as long as the holes have the same area as that of circular holes having an average diameter of 100 to 300 μm. In other words, the shape of the minute holes is not necessarily a perfect circle in the present invention.

Any polymeric film which is usually used can be employed as a material for forming the film in the present invention, and a laminated film can also be used; the present invention is not limited by the film material. It is more desirable that the innermost layer of the film be a layer which can be heat sealed at a low temperature because such a film can be easily heat sealed. However, a method using a rubber band can also be employed as long as perfect sealing can be attained. Further, the film of the present invention is not necessarily transparent, and printing, an anti-fogging treatment or the like may be provided to the film, if necessary. It is possible to provide the holes either before or after the process of printing, an anti-fogging treatment or the like.

Any means such as a physical means using a heated needle or the like, or an optical means such as a laser can be used to provide minute holes in a film. Holes having a diameter in the range of 100 to 300 μm can be satisfactorily provided even by a physical means, so that such holes are advantageous from the viewpoint of the processing cost. It is, of course, possible to process these holes by using a laser or the like. In this case, the diameter of the holes can be more accurately controlled. In addition, when a laser is used to provide minute holes, a target film is required to efficiently absorb the laser light. For instance, when a $CO_2$ laser is used, a polystyrene film which shows a high absorption at an oscillation wavelength of 10.6μ is more suitable for providing minute holes, and minute holes can be efficiently provided in this film by a laser with a lower power output.

In the present invention, object vegetables and fruits have a great respiration volume. Therefore, when they are tightly packaged, an excessive amount of water vapor gathers in the package. As a result, the content of the package readily gets moldy or is corrupted. It is necessary to select the water vapor permeability of a film by further limiting the film material in the case of the packaging of, for example, broccoli, unripe plums and mushrooms. The water vapor permeability at 40° C. and 90 RH % required to retain the freshness of these vegetables is from 30 to 300 g/m²·24 hrs, and more preferably from 50 to 200 g/m²·24 hrs. When the water vapor permeability is 30 g/m²·24 hrs or less, the content of the package rapidly gets moldy or is corrupted because of the excessive amount of water vapor in the package. On the other hand, when the water vapor permeability is 300 g/m²·24 hrs or more, the content of the package withers and its weight is remarkably decreased due to the transpiration thereof, and thus it loses its commercial value.

It has been found by our experiments that a water vapor permeability in such a range cannot be attained by the above-described minute holes. Therefore, it is necessary to rely on the water vapor permeability of the film material itself. A film of polystyrene, polybutadiene, polyamide, polyvinyl alcohol, polyvinyl chloride, polymethyl pentene, regenerated cellulose or the like, or, if necessary, a laminate thereof can be used as a film which has a water vapor permeability in the above-described range.

By the packaging film for retaining the freshness of vegetables and fruits according to the present invention, it becomes possible to control the oxygen and carbonic acid gas transmission rates of a single film prepared by using any material or a laminate thereof, and the MA preservation becomes possible, in which vegetables and fruits are preserved under a low-oxygen, high-carbonic acid gas state. Further, by selecting a film material to obtain a proper water vapor permeability, transpiration from the film can be properly controlled, and the content of the package is prevented from getting moldy or being corrupted which is caused because of the excessive amount of water gathered in the package. As described above, a film composed of either a single layer or multiple layers can be used in the present invention. Examples of the film composed of multiple layers include polyamide/non-oriented polystyrene, polyamide/polybutadiene, biaxially-oriented polystyrene, polyvinyl alcohol/non-oriented polystyrene, and polyvinyl alcohol/polybutadiene.

The Invention of Group E

The present invention in this embodiment relates to a method and a package for retaining the freshness of broccoli, and, more particularly, to a method and a package for retaining the freshness of broccoli, in which a package of broccoli is obtained by means of airtight packaging and the composition of gas in the package is kept properly.

Broccoli loses its freshness soon after it is harvested, so that it turns yellow within several days when preserved at room temperature after harvest, and loses its commercial value. For this reason, in particular, in the case where broccoli is transported to a remote place, it is necessary to think out a means for preventing the broccoli from yellowing so that it will not lose its commercial value. There have been tried various methods to retain the freshness of broccoli.

With respect to the technique for retaining the freshness of broccoli, the utilization of low temperatures has been conventionally known. It has been known that the yellowing of broccoli is prevented by this technique. Further, it has been known that the so-called MA (modified atmosphere) preservation is effective, in which the inside of a package is kept in a low-oxygen, high-carbonic acid gas state by utilizing both airtight packaging attained by a plastic film and the respiration of vegetable or fruit packed therein. In almost all cases, only a corrugated fiberboard box is used for the distribution of broccoli at the normal temperature. However, at some places of production, simple MA packaging is conducted, in which broccoli is packed with a film by means of fold packaging. In this case, a polyethylene film, an inorganic-pigment-incorporated film, a biaxially-oriented polypropylene film provided with an anti-fogging treatment, or the like is used.

In the case of the above-described distribution of broccoli at the normal temperature, broccoli completely yellows within two or three days when it is packed only in a corrugated fiberboard box because the respiration of broccoli is very active. Further, in the case of the MA preservation of broccoli at the normal temperature, a film to be used is required to have a high oxygen transmission rate. When the oxygen transmission rate of the film is insufficient, the oxygen concentration in the package is rapidly decreased. As a result, a respiration trouble is caused, and the broccoli in the package emits an offensive odor and undergoes some other troubles. The broccoli thus loses its commercial value.

According to our experiments, an MA packaging film used for the distribution of broccoli at the normal temperature is required to have an oxygen transmission rate at 23° C. of 10000 to 100000 cc/$m^2$·24 hrs·atm. However, it is very difficult to attain such an oxygen transmission rate by using an ordinary general-purpose polymeric film. Moreover, when the MA packaging is conducted by sealing, there is a possibility that a respiration trouble is caused because of a lack of oxygen inside the package. Thus, a film suitable for the MA packaging of broccoli has not been obtained.

Broccoli emits a large amount of water vapor, so that dew condensation is caused in the package. When the waterdrops fall on the broccoli by their own weights, the broccoli gets moldy or is corrupted, resulting in remarkable deterioration in the quality of the broccoli. The amount of these waterdrops is much larger than the one in the case of other agricultural products, and the dew condensation cannot be prevented even by a film provided with an ordinary anti-fogging treatment.

Further, the above packaging form is employed as an inner bag of corrugated fiberboard box. Therefore, the freshness of broccoli is retained only from the time it is harvested, until the time it is sold, and the retention of the freshness of broccoli after it is sold at a shop has not been ensured at all. This embodiment is to solve the above-described problems in the prior art, and to provide a method and a package suitable for retaining the freshness of broccoli.

We have made earnest studies, and, as a result, found that the oxygen and carbonic acid gas concentrations in a package of broccoli closely relate to the retention of thefreshness of the broccoli. The present invention has been accomplished on the basis of this finding. Namely, the gist of the present invention is a method for retaining the freshness of broccoli, comprising packaging broccoli in a pouch prepared by using a film provided with minute holes, having a proper water vapor permeability, sealing the pouch, and keeping the oxygen concentration and the carbonic acid concentration in the pouch at 3 to 15% and 6 to 18%, respectively, and another gist of the present invention is a package of broccoli, having the above-described gas conditions.

In order to attain the above conditions, a film in which 10 to 500 pieces/$m^2$ of minute holes having an average diameter of 100 to 300 µm are provided in order to make the oxygen and carbonic acid gas transmission rates of the film from 10000 to 100000 cc/$m^2$·24 hrs·atm is used for forming a pouch, and a pouch having 50 pieces or less of the minute holes is used for the packaging of broccoli. Further, a film which has a water vapor permeability at 40° C. and 90 RH % of 100 to 300 g/$m^2$·24 hrs in addition to the above gas transmission rates required is used.

This embodiment will now be explained in detail.

The method of the present invention comprises packaging broccoli in a pouch prepared by using a film provided with minute holes, sealing the pouch, and keeping the oxygen concentration and the carbonic acid gas concentration in the pouch at 3 to 15% and 6 to 18%, respectively. According to our experiments, when the oxygen concentration in the pouch is 3% or less, or the carbonic acid gas concentration is 18% or more, the broccoli in the pouch cannot be normally metabolized, and emits organic gas which is a cause of an offensive odor. On the other hand, when the oxygen concentration is 15% or more, or the carbonic acid gas concentration is 6% or less, the broccoli respires actively, so that it yellows immediately. For this reason, it is necessary to keep the oxygen concentration and the carbonic acid gas concentration in the pouch at 3 to 15% and 6 to 18%, respectively.

The oxygen and carbonic acid gas transmission rates at 23° C. of the entire film provided with minute holes used in the present invention is from 10000 to 100000 cc/$m^2$·24 hrs·atm, and more preferably from 20000 to 60000 cc/$m^2$·24 hrs·atm. Namely, by the use of a film having a gas transmission rate in this range, the above-described oxygen concentration and carbonic acid gas concentration in the pouch can be maintained at 3 to 15% and 6 to 18%, respectively.

When the film of the present invention is used, the oxygen transmission rate and the carbonic acid gas transmission rate of the film are almost equal, so that the gas concentration in the pouch inevitably reaches to a low-oxygen, high-carbonic acid gas state. For this reason, double effects on retaining the freshness obtainable by a low oxygen concentration and a high carbonic acid gas concentration can be obtained at the same time. Therefore, a gas composition in which the carbonic acid gas concentration is approximately 6% can be obtained even when the oxygen concentration is 15%. The range of a gas composition which can bring about the freshness-retaining effect is thus extremely wide, and such a possibility that the broccoli emits an offensive odor because the oxygen concentration is excessively low can be eliminated.

The packaging film useful for broccoli according to the present invention is provided with minute holes having an average diameter of 100 to 300 µm. The oxygen and carbonic acid gas transmission rates of the film depend on the diameter and the number of the minute holes provided, that is, the area of the minutes holes. According to our experiments, the oxygen and carbonic acid gas transmission rates per minute hole are from 100 to 900 cc/m²·24 hrs·atm. This means that the transmission amounts of oxygen and carbonic acid gas which pass through the minute hole are equal, and that they are in proportional to the area of the hole. For instance, it has been made clear by our experiments that the oxygen and carbonic acid gas transmission rates per minute hole is approximately 100 cc/m²·24 hrs·atm when the minute holes have an average diameter of 100 μm. Therefore, the oxygen transmission rate of a film can be controlled by changing the number of the holes per centiare. In the case of the packaging of broccoli, when the diameter of the minute holes is 100 μm and the number of the minute holes is from 10 to 500 pieces/m², the oxygen and carbonic acid gas transmission rates at 23° C. is from 10000 to 100000 cc/m²·24 hrs·atm.

Any means such as a physical means using a heated needle or the like, or an optical means such as a laser can be used to provide minute holes in a film. Holes having a diameter in the range of 100 to 300 μm can be satisfactorily provided even by a physical means, so that such holes are advantageous from the viewpoint of the processing cost. It is, of course, possible to process minute holes by using a laser or the like. In this case, the diameter of the holes can be more accurately controlled. In addition, when a laser is used to provide minute holes, a target film is required to efficiently absorb the laser light. For instance, when a $CO_2$ laser is used, a polystyrene film which shows a high absorption at an oscillation wavelength of 10.6μ is more suitable for providing minute holes, and minute holes can be efficiently provided in this film by a laser with a lower power output.

Further, the film used in the present invention preferably has a water vapor permeability at 40° C. and 90 RH % of 100 to 300 g/m²·24 hrs. The transpiration of water vapor depends not on the minute holes provided but on the water vapor permeability of the base film. Therefore, in order to prevent the dew condensation due to the transpiration of broccoli, it is necessary to use a film whose water vapor permeability is in the above-described range. When the water vapor permeability is 100 g/m²·24 hrs or less, a large amount of water-drops is deposited on the inner surface of the package, and broccoli packed therein is corrupted or gets moldy, resulting in deterioration in the quality of the broccoli. On the other hand, when the water vapor permeability is 300 g/m²·24 hrs or more, the broccoli withers and its weight is remarkably decreased by the transpiration thereof. Thus, deterioration in the quality of the broccoli is brought about. A polystyrene, cellophane, nylon, vinylon or polybutadiene film can be mentioned as a film which has a water vapor permeability in the above-described range. However, the film which can be used in the present invention is not limited to these films.

A film composed of either a single layer or multiple layers can be used in the present invention. Examples of the film composed of multiple layers include polyamide/non-oriented polystyrene, polyamide/polybutadiene, biaxially-oriented polystyrene, polyvinyl alcohol/non-oriented polystyrene, and polyvinyl alcohol/polybutadiene. Even if a film is provided with an anti-fogging treatment, broccoli packed with the film cannot be prevented from being corrupted or getting moldy. It is however desirable to provide an anti-fogging treatment to a film in order to enhance the commercial value of the broccoli.

In the present invention, it is essential to conduct airtight packaging in order to keep the gas composition in a proper range. There is no particular limitation on the method of sealing. When the innermost layer of the film of the present invention can be sealed at a low temperature, sealing can be readily attained by heat sealing. It is therefore clear that such a film is more desirable. However, even by bag sealing, a current leading manner, in which tape is used to close an opening, a package can be satisfactorily sealed. Any method can thus be used for the sealing.

In the present invention, the freshness-retaining effect can be maintained for a longer period of time when a piece of vegetable is packaged. In general, consumers purchase broccoli by the unit of piece. Therefore, when a piece of broccoli is packaged for sale, the freshness of the broccoli can be retained from the time it is sold, until the time the package is opened. It is desirable to conduct the operation of this packaging at a place of harvest because the freshness of broccoli can be retained from the time when it is harvested. However, even when broccoli is packaged at the back yard of a retail store such as a supermarket, the freshness of the broccoli can be retained for an extended period of time after the broccoli is displayed at the store.

The MA preservation of broccoli in which broccoli is preserved under a low-oxygen, high-carbonic acid gas state becomes possible by the use of the packaging film useful for broccoli according to the present invention.

The Invention of Group F

The invention according to this embodiment relates to a package useful for retaining the freshness of mushrooms, and, more specifically, to a freshness-retaining package useful for the distribution and selling of mushrooms which are divided into small quantities after harvest.

Packaging using a stretched film and a tray is predominant as a packaging form of a small amount of mushrooms such as shiitake, maitake, agarics, tsukuritake and shiromogitake (honshimeji) employed at the time of the distribution and selling thereof. Soft polyvinyl chloride, oriented polystyrene, expanded polystyrene, polystyrene paper or the like has been used as a material for the tray. A soft polyvinyl chloride film, a polyethylene film or the like has been used as the stretched film. Other packaging forms conventionally practiced are only the following: shiitake is packed in a net bag; and enokitake is packed by means of degassing packaging.

In general, the respiration and transpiration of mushrooms are very active, so that the retention of the freshness of mushrooms upon the distribution and selling is one of the essential requirements. The current leading form of the packaging of mushrooms, "tray+stretched film packaging" (hereinafter referred to as tray-stretch packaging), brings about the following freshness-retaining effects in addition to the effect of retaining the shape of mushrooms during the distribution and selling:

(1) Proper MA (modified atmosphere) effect; and (2) Proper transpiration-restricting effect.

The effect (1) is such that the inside of a package is kept in a low-oxygen, high-carbonic acid gas state by utilizing both the gas transmission of a film and the respiration of vegetable or fruit placed in the package. This MA effect is obtained even when mushrooms are packaged. By decreasing the oxygen concentration in a vessel, the freshness-retaining effects by which the browning of the content and the growth of aerial mycels are prevented can be obtained. In general, mushrooms are articles which scarcely cause troubles due to the low oxygen concentration or the high carbonic acid gas concentration, so that they are suitable for the MA packaging. In the tray-stretch packaging, the above-described MA effect can be expected when the oxygen transmission rate of the stretched film which is placed on mushrooms is in a range proper to the mushrooms, and when the sealing between the tray and the stretched film is perfect.

By the effect (2), the mushrooms packaged are prevented from losing the weight thereof because of the transpiration thereof. When the vessel has a proper water vapor permeability, the freshness-retaining effect can be highly obtained. It is clear that when the water vapor permeability is too high, the content of the package loses its commercial value because it is dried and loses its weight. On the other hand, when the water vapor permeability is too low, water vapor transpired in the package becomes a hot bed of mold and corruption; the content of the package thus loses its commercial value.

For this reason, a proper water vapor permeability is required to the vessel as a whole. In the case of the tray-stretch packaging form, the water vapor permeability of the stretched film placed on the upper part of the whole package is dominant. A soft polyvinyl chloride film having a high water vapor permeability is used as the stretched film in many cases. However, in recent years, a polyethylene film is used as the stretched film in some cases. Further, a vessel prepared by using polystyrene paper is employed as a vessel of honshimeji or the like. In this case, the water vapor permeability of the polystyrene paper is so high that the water vapor permeability of the vessel as a whole is controlled by the water vapor permeabilities of both the tray and the stretched film.

However, public attention has been focused on environmental problems recently, and it is the current tendency that neither tray nor vinyl chloride is used for producing packaging vessels. In addition, the packaging of vegetables and fruits is becoming simpler than before. In particular, there is a tendency to avoid the use of those trays which are prepared by using expanded polystyrene or polystyrene paper in consideration of environmental problems. It is therefore the present situation that packaging without using a tray is gradually spreading.

There is the same tendency in the packaging of mushrooms, and packaging without using any tray is strongly demanded. However, it is necessary to package mushrooms in order to retain the freshness thereof as described above. Further, in the prior art, there is no packaging form which is simple, and which can bring about the freshness-retaining effect equal to or higher than the one obtainable by the current packaging form. Furthermore, in the tray-stretch packaging form, it is easily happened that the sealing between the stretched film and the tray is imperfect. In this case, the oxygen concentration in the vessel is increased because of the inflow of the outside air. As a result, mushrooms placed in the vessel undergo browning and the growth of mycels, and thus loses their freshness. In addition, the stretched film is weak in strength, so that it may be partly broken depending upon the content. It is unavoidable that the content of the vessel loses freshness also in this case.

We have made earnest studies in order to solve all of the aforementioned problems, and, as a result, found that a package of mushrooms having the freshness-retaining effect which is equal to or higher than the current one can be obtained without using a tray and a stretched film, by packaging mushrooms in an airtight small bag prepared by using a film having a proper oxygen transmission rate and a proper water vapor permeability. The present invention has been accomplished on the basis of this finding.

Namely, the present invention is directed to a packaging form comprising an airtight small bag which is prepared by using a film, and the gist of the invention is such that the film has an oxygen transmission rate at 23° C. of 3000 to 30000 cc/m$^2$·24 hrs·atm, and a water vapor permeability at 40° C. of 50 to 200 g/m$^2$·24 hrs·atm. This embodiment will now be explained in detail.

The packaging material useful for mushrooms of the present invention is composed of a single film or a laminated film, and the film is required to have an oxygen transmission rate at 23° C. of 3000 to 30000 cc/m$^2$·24 hrs·atm, and a water vapor permeability at 40° C. of 50 to 200 g/m$^2$·24 hrs·atm. The optimum oxygen transmission rate and water vapor permeability vary depending upon the type of mushrooms packed in the package. When the oxygen transmission rate is 3000 cc/mm$^2$·24 hrs·atm or less, the content of the package immediately emits an offensive odor because of the respiration trouble caused due to the low oxygen concentration, and drastically loses its commercial value. On the other hand, when the oxygen transmission rate is 30000 cc/m$^2$·24 hrs·atm or more, the oxygen concentration in the inner system is not decreased, so that the MA effect cannot be easily obtained. For this reason, the content of the package undergoes the growth of aerial mycels and browning, and thus loses its commercial value.

In the present invention, it is important to define the water vapor permeability as well as the oxygen transmission rate of the film. Namely, when the water vapor permeability is 200 g/m$^2$·24 hrs·atm or more, the content of the package loses its weight, and are dried and withered due to the transpiration thereof. On the other hand, when the water vapor permeability is 50 g/m$^2$·24 hrs·atm or less, water stayed inside the package becomes a hot bet of mold and corruption. In either cases, the content of the package drastically loses its freshness.

Polystyrene, polybutadiene, polyamide, polyvinyl alcohol, polyvinyl chloride, polymethyl pentene, regenerated Cellosolve or the like can be used as the material for forming a film having the above physical properties because of their water vapor permeabilities. Either a single film or a laminated film of these polymers can be used. In the present invention, it is desirable to seal the package by heat sealing. It is also possible to impart heat-sealing properties without remarkably changing the water vapor permeability by partly applying a heat-sealing agent, if necessary.

In the present invention, in the case where the oxygen transmission rate is insufficient, it is possible to control the oxygen transmission rate to large by providing minute holes having a diameter of 100 to 300 μm in the film. For instance, in the case of the packaging of shiitake or the like, it has a large respiration volume, so that the film is required to have an oxygen transmission rate at 23° C. of 10000 cc/m$^2$·24 hrs·atm or more in order to obtain the proper MA effect. However, there may be a case where this oxygen transmission rate cannot be obtained by the use of the above-described single film or laminated film. In such a case, the desired oxygen transmission rate can be obtained by providing a proper number of minute holes having a diameter of 100 to 300 μm in the film.

The oxygen transmission rate per minute hole is approximately 100 cc/m$^2$·24 hrs·atm when the minute holes have an average diameter of 100 μm. The oxygen transmission rate is in proportional to the total area of the holes. It has been made clear by our experiments that the water vapor permeability is hardly affected by the minute holes having such a small diameter. The water vapor permeability of the film mostly depends on the water vapor permeability inherent in the film material.

The present invention can be applied to any packaging form such as a conventional flat bag and gusseted bag. When packaging such as pillow packaging is conducted by a continuous packaging machine, it is possible to conduct filling packaging at a speed higher than that of the conventional tray-stretch packaging. The productivity is thus remarkably increased. Of course, it is also possible to improve the shape retention and the design by using a paper tray or the like in the vessel. Further, perfect sealing can be attained because ordinary heat sealing, impulse sealing, ultrasonic sealing or the like can be conducted. The MA effect can thus be stably obtained.

In the present invention, the film has a proper water vapor permeability, so that it is characterized in that only a small amount of waterdrops deposits on the surface of the film. However, under such a condition that the temperature changes rapidly, the film is tentatively fogged, and its appearance becomes worse. It is possible to obtain a package which is excellent in transparency by providing an anti-fogging treatment to the innermost surface of the film. Either an incorporation or application method can be employed to conduct the anti-fogging treatment.

By using an airtight small bag prepared by using a film according to the present invention, an oxygen transmission rate and a water vapor permeability which are proper to the content of the bag, and anti-fogging properties can be stably imparted. Therefore, the freshness-retaining effect can be improved as compared with the conventional tray-stretch packaging, and a package having an appearance excellent in transparency can be obtained. In addition, the productivity can be enhanced by conducting high-speed filling packaging such as pillow packaging, and the distribution and selling can be done with the freshness of the content of the package maintained. Moreover, according to the present invention, packaging can be conducted without using a tray, so that the present invention is desirable from the environmental point of view.

The specific structures of the packages of fresh plant according to the present invention will now be explained by referring to the following examples.

<Plastic Films for Inner Bag of Corrugated Fiberboard Box>
Referential Example A1

By using a mixture of 90 parts by weight of a styrene-butadiene block copolymer ("K Resin KR-04" manufactured by Shin-Nippon Steel Chemical Co., Ltd.) and 10 parts by weight of high-impact polystyrene ("S-61" manufactured by Shin-Nippon Steel Chemical Co., Ltd.) as a starting material, molding was conducted by the inflation method to obtain plastic film (A) having a thickness of 30 μm.

The water vapor permeability of this plastic film (A) at 40° C. and 90 RH % is 140 g/m$^2$·24 hrs.

Referential Example A2

By using a polyethylene resin ("Moretec 0238N" manufactured by Idemitsu Petrochemical Co., Ltd.) as a starting material, molding was conducted by the inflation method to obtain plastic film (B) having a thickness of 30 μm.

The water vapor permeability of this plastic film (B) at 40° C. and 90 RH % is 15 g/m$^2$·24 hrs.

Referential Example A3

A non-oriented polypropylene film having a thickness of 30 μm ("WH-OP NFHC" manufactured by TOHCELLO Co., Ltd.) was prepared as plastic film (C).

The water vapor permeability of this plastic film (C) at 40° C. and 90 RH % is 9 g/m$^2$·24 hrs.

Example A1 and Comparative Examples A1 and A2

By using the plastic films (A), (B) and (C), pouches with the three sides thereof sealed, each having a size of 650 mm (depth)×720 mm (opening) were prepared. Each of these pouches was used as an inner bag of corrugated fiberboard box. 4 kg of broccoli was placed in the inner bag of corrugated fiberboard box, and the opening of the pouch was closed by means of non-airtight fold packaging. Thereafter, the corrugated fiberboard box was closed by putting a top lid. Thus, packages of fresh plant of Example and Comparative Examples were obtained.

These packages of fresh plant were preserved at 23° C., and the gas concentration in each pouch, that is, each inner bag of corrugated fiberboard box, was measured during the preservation. The results are shown in Table A1.

Further, a change in the appearance of the broccoli during the preservation was observed. The results are shown in Table A2.

Furthermore, the rate of decrease in the weight of the broccoli during the preservation was determined. The results are shown in Table A3.

The case where the pouch made of the plastic film (A) was used as the inner bag of corrugated fiberboard box is represented by Example A1; the case where the pouch made of the plastic film (B) was used as the inner bag of corrugated fiberboard box is represented by Comparative Example A1; and the case where the pouch made of the plastic film (C) was used as the inner bag of corrugated fiberboard box is represented by Comparative Example A2.

TABLE A1

| | 2nd Day of Preservation | | 4th Day of Preservation | |
|---|---|---|---|---|
| | Oxygen (vol. %) | Carbonic Acid Gas (vol. %) | Oxygen (vol. %) | Carbonic Acid Gas (vol. %) |
| Example A1 | 6.7 | 10.9 | 6.6 | 9.7 |
| Comparative Example A1 | 7.0 | 9.0 | 9.2 | 7.7 |
| Comparative Example A2 | 7.2 | 9.7 | 8.9 | 8.1 |

TABLE A2

| | 2nd Day of Preservation | 4th Day of Preservation |
|---|---|---|
| Non-packed | Slightly yellowed, began to wither | Yellowed, withered |
| Example A1 | Green color maintained, good appearance | Green color maintained, good appearance |
| Comparative Example A1 | Green color maintained, good appearance | Partly molded and corrupted |
| Comparative Example A2 | Green color maintained, good appearance | Partly molded and corrupted |

TABLE A3

| | 4th Day of Preservation | |
|---|---|---|
| | Growth Rate of Mold (%) | Rate of Decrease in Weight (%) |
| Non-packed | 10 | 4.2 |
| Example A1 | 2 | 1.8 |
| Comparative Example A1 | 47 | 0.5 |
| Comparative Example A2 | 55 | 0.4 |

As the data shown in Table A1 demonstrate, a gas concentration suitable for the MA preservation of fresh plant was attained in the inner bag of corrugated fiberboard box of each one of the packages of fresh plant.

Further, as the data shown in Tables A2 and A3 demonstrate, the broccoli, a fresh plant, packed in the package of fresh plant of Example A1 did not lose its green color, and was prevented from getting moldy or being corrupted during the preservation. Moreover, owing to the proper transpiration-suppressing effect, the decrease in the weight of the broccoli was in an acceptable range.

By contrast, in the packages of fresh plant of Comparative Examples A1 and A2, the broccoli got moldy, and was softened and corrupted because the inside of the inner bag of corrugated fiberboard box of each package became excessively humid.

The referential non-packed broccoli withered immediately because of the transpiration of the broccoli.

According to the package of fresh plant of the present invention, there can be obtained the excellent properties of retaining the freshness of a fresh plant packed therein during the distribution thereof, and the loss of the fresh plant caused during the distribution and selling thereof is thus minimized. For this reason, the present invention can bring about many practical effects. Referential Example B1

By using a mixture of 90 parts by weight of a styrene-butadiene block copolymer ("K Resin KR-04" manufactured by Shin-Nippon Steel Chemical Co., Ltd.) and 10 parts by weight of high-impact polystyrene ("S-61" manufactured by Shin-Nippon Steel Chemical Co., Ltd.) as a starting material, molding was conducted by the inflation method to obtain plastic film (A) having a thickness of 30 µm.

The water vapor permeability of this plastic film (A) at 40° C. and 90 RH % is 140 g/m$^2$·24 hrs.

Referential Example B2

By using a polyethylene resin ("Moretec 0238N" manufactured by Idemitsu Petrochemical Co., Ltd.) as a starting material, molding was conducted by the inflation method to obtain plastic film (B) having a thickness of 30 µm.

The water vapor permeability of this plastic film (B) at 40° C. and 90 RH % is 15 g/m$^2$·24 hrs.

Referential Example B3

A non-oriented polypropylene film having a thickness of 30 µm ("WH-OP NFHC" manufactured by TOHCELLO Co., Ltd.) was prepared as plastic film (C).

The water vapor permeability of this plastic film (C) at 40° C. and 90 RH % is 9 g/m$^2$·24 hrs.

Example B1 and Comparative Examples B1 and B2

By using the plastic films (A), (B) and (C), pouches with the three sides thereof sealed, each having a size of 220 mm (opening)×290 mm (depth) were prepared. A piece of broccoli was placed in each of these pouches, and the opening of the pouch 2 was turned up as shown in FIG. 1 to entirely wrap the broccoli 1. The turned portion of the pouch was then fixed by means of bag sealing (banding) using tape. Thus, three types of unit packages of broccoli were obtained.

These unit packages of broccoli were preserved at 23° C., and the gas concentration in each pouch was determined during the preservation. The results are shown in Table B1.

Further, a change in the appearance of the broccoli packed in each pouch during the preservation was observed. The results are shown in Table B2.

Furthermore, the rate of decrease in the weight of the broccoli packed in each pouch during the preservation was determined. The results are shown in Table B3.

The case where the pouch made of the plastic film (A) was used is represented by Example B1; the case where the pouch made of the plastic film (B) was used is represented by Comparative Example B1; and the case where the pouch made of the plastic film (C) was used is represented by Comparative Example B2.

TABLE B1

|  | 2nd Day of Preservation | | 4th Day of Preservation | |
| --- | --- | --- | --- | --- |
|  | Oxygen (vol. %) | Carbonic Acid Gas (vol. %) | Oxygen (vol. %) | Carbonic Acid Gas (vol. %) |
| Example B1 | 8.3 | 6.5 | 4.7 | 6.2 |
| Comparative Example B1 | 7.3 | 7.5 | 5.6 | 5.7 |
| Comparative Example B2 | 7.9 | 5.5 | 4.1 | 6.5 |

TABLE B2

|  | 2nd Day of Preservation | 4th Day of Preservation |
| --- | --- | --- |
| Non-packed | Yellowed, began to wither | Yellowed, withered |
| Example B1 | Green color maintained, good appearance | Green color maintained, good appearance |
| Comparative Example B1 | Green color maintained, good appearance | Got moldy and corrupted |
| Comparative Example B2 | Green color maintained, good appearance | Got moldy and corrupted |

TABLE B3

|  | 4th Day of Preservation | |
| --- | --- | --- |
|  | Growth Rate of Mold (%) | Rate of Decrease in weight (%) |
| Non-packed | 10 | 8.2 |
| Example B1 | 2 | 2.8 |
| Comparative Example B1 | 55 | 0.4 |
| Comparative Example B2 | 65 | 0.3 |

As the data shown in Table B1 demonstrate, a gas concentration suitable for the MA preservation of fresh plant was attained in each of the unit packages of fresh plant.

Further, as the data shown in Tables B2 and B3 demonstrate, the broccoli, a fresh plant, packed in the unit package of fresh plant of Example B1 kept its green color, and was prevented from getting moldy or being corrupted during the preservation. Moreover, owing to the proper transpiration-suppressing effect, the decrease in the weight of the broccoli was in an acceptable range.

By contrast, in the unit packages of fresh plant of Comparative Examples B1 and B2, the broccoli got moldy, and was softened and corrupted because the inside of each unit package became excessively humid.

The referential non-packed broccoli withered immediately because of the transpiration of the broccoli.

According to the unit package of fresh plant of the present invention, there can be obtained the excellent properties of retaining the freshness of a fresh plant packed therein from the time it is harvested, until the time it is consumed by a consumer, and the loss of the fresh plant caused during the distribution and selling thereof is thus minimized. For this reason, the present invention can bring about many practical effects.

Referential Example C1

By using a mixture of 90 parts by weight of a styrene-butadiene block copolymer ("K Resin KR-04" manufactured by Shin-Nippon Steel Chemical Co., Ltd.) and 10 parts by weight of high-impact polystyrene ("S-61" manufactured by Shin-Nippon Steel Chemical Co., Ltd.) as a starting material, molding was conducted by the inflation method to obtain plastic film (A) having a thickness of 30 μm.

The water vapor permeability of this plastic film (A) at 40° C. and 90 RH % is 140 g/m$^2$·24 hrs.

Referential Example C2

By using a polyethylene resin ("Moretec 0238N" manufactured by Idemitsu Petrochemical Co., Ltd.) as a starting material, molding was conducted by the inflation method to obtain plastic film (B) having a thickness of 30 μm.

The water vapor permeability of this plastic film (B) at 40° C. and 90 RH % is 15 g/m$^2$·24 hrs.

Referential Example C3

A non-oriented polypropylene film having a thickness of 30 μm ("WH-OP NFHC" manufactured by TOHCELLO Co., Ltd.) was prepared as plastic film (C).

The water vapor permeability of this plastic film (C) at 40° C. and 90 RH % is 9 g/m$^2$·24 hrs.

Example C1 and Comparative Examples C1 and C2

By using the plastic films (A), (B) and (C), pouches with the three sides thereof sealed, each having a size of 230 mm (opening)×210 mm (depth) were prepared. A piece of broccoli was placed in each of these pouches, and the opening of the pouch 2 was fixed at a proper point on the stalk part of the broccoli by using a rubber band 3 as shown in FIG. 2. Thus, three types of non-airtight packages of broccoli were obtained. It is noted that 100 packages were prepared by using each type of the pouches.

These packages of broccoli were preserved at 23° C., and the gas concentration in each pouch was measured during the preservation. The results are shown in Table C1.

Further, a change in the appearance of the broccoli placed in each pouch during the preservation was observed. The results are shown in Table C2.

Furthermore, the rate of decrease in the weight of the broccoli placed in each pouch during the preservation was determined. The results are shown in Table C3.

The case where the pouch made of the plastic film (A) was used is represented by Example C1; the case where the pouch made of the plastic film (B) was used is represented by Comparative Example C1; and the case where the pouch made of the plastic film (C) was used is represented by Comparative Example C2.

TABLE C1

|  | 2nd Day of preservation | | 4th Day of preservation | |
| --- | --- | --- | --- | --- |
|  | Oxygen (vol. %) | Carbonic Acid Gas (vol. %) | Oxygen (vol. %) | Carbonic Acid Gas (vol. %) |
| Example C1 | 6.0 | 7.1 | 6.9 | 8.1 |
| Comparative Example C1 | 7.9 | 5.5 | 4.1 | 7.5 |
| Comparative Example C2 | 5.0 | 9.0 | 4.0 | 9.8 |

TABLE C2

|  | 2nd Day of Preservation | 4th Day of Preservation |
| --- | --- | --- |
| Non-packed | Yellowed, began to wither | Yellowed, withered |
| Example C1 | Green color maintained, good appearance | Green color maintained, good appearance |
| Comparative Example C1 | Green color maintained, partly got moldy | Got moldy and corrupted |
| Comparative Example C2 | Green color maintained, partly got moldy | Got moldy and corrupted |

TABLE C3

|  | 4th Day of preservation | |
| --- | --- | --- |
|  | Growth Rate of Mold (%) | Rate of Decrease in Weight (%) |
| Non-packed | 10 | 7.5 |
| Example C1 | 2 | 2.7 |
| Comparative Example C1 | 65 | 0.5 |
| Comparative Example C2 | 75 | 0.3 |

As the data shown in Table C1 demonstrate, a gas concentration suitable for the MA preservation of fresh plant was attained in each of the unit packages of fresh plant.

Further, as the data shown in Tables C2 and C3 demonstrate, the broccoli, a fresh plant, packed in the package of Example C1 kept its green color, and is prevented from getting moldy or being corrupted during the preservation. Moreover, owing to the proper transpiration-suppressing effect, the decrease in the weight of the broccoli was in an acceptable range.

By contrast, in the packages of fresh plant of Comparative Examples C1 and C2, the broccoli got moldy, and was softened and corrupted because the inside of each package became excessively humid.

The referential non-packed broccoli withered immediately because of the transpiration of the broccoli.

According to the package of fresh plant having a stalk part and a flower bud part of the present invention, there can be obtained the excellent properties of retaining the freshness of a fresh plant packed therein from the time it is harvested, until the time it is consumed by a consumer, and the loss of the fresh plant caused during the distribution and selling thereof is thus minimized. For this reason, the present invention can bring about many practical effects.

Further, the present invention has some other effects as follows: since the package of fresh plant having a stalk part and a flower bud part according to the present invention is obtained by partly wrapping the stalk part and entirely wrapping the flower bud part in a plastic film, it is not necessary to use a large amount of the plastic film, a wrapping material; and the packaging operation can be readily conducted because the packaging form is simple.

Example D1

50 pieces/m$^2$ of holes having an average diameter of 150 μm were continuously provided, by using a heated needle, in a biaxially-oriented polypropylene film having a thickness of 30 μm (manufactured by TOHCELLO Co., Ltd.) whose one surface can be heat sealed.

Example D2

100 pieces/m² of holes having an average diameter of 150 μm were continuously provided, by using a heated needle, in a biaxially-oriented polypropylene film having a thickness of 30 μm (manufactured by TOHCELLO Co., Ltd.) whose one surface can be heat sealed.

Example D3

200 pieces/m² of holes having an average diameter of 150 μm were continuously provided, by using a heated needle, in a biaxially-oriented polypropylene film having a thickness of 30 μm (manufactured by TOHCELLO Co., Ltd.) whose one surface can be heat sealed.

Example D4

200 pieces/m² of holes having an average diameter of 150 μm were continuously provided, by using a heated needle, in a biaxially-oriented polypropylene film having a thickness of 30 μm (manufactured by TOHCELLO Co., Ltd.) whose one surface can be heat sealed. Printing was then conducted on the film provided with the holes.

Example D5

100 pieces/m² of holes having an average diameter of 150 μm were continuously provided, by using a heated needle, in a non-oriented polystyrene film having a thickness of 30 μm (manufactured by Toko Shizai Kogyo Kabushiki Kaisha).

Comparative Example D1

50 100 pieces/m² of holes having an average diameter of 500 μm were continuously provided, by using a heated needle, in a biaxially-oriented polypropylene film having a thickness of 30 μm (manufactured by TOHCELLO Co., Ltd.) whose one surface can be heat sealed.

Comparative Example D2

250 pieces/m² of holes having an average diameter of 50 μm were continuously provided, by using a laser, in a biaxially-oriented polypropylene film having a thickness of 30 μm (manufactured by TOHCELLO Co., Ltd.) whose one surface can be heat sealed.

Comparative Example D3

500 pieces/m² of holes having an average diameter of 50 μm were continuously provided, by using a laser, in a biaxially-oriented polypropylene film having a thickness of 30 μm (manufactured by TOHCELLO Co., Ltd.) whose one surface can be heat sealed.

Comparative Example D4

1000 pieces/m² of holes having an average diameter of 50 μm were continuously provided, by using a laser, in a biaxially-oriented polypropylene film having a thickness of 30 μm (manufactured by TOHCELLO Co., Ltd.) whose one surface can be heat sealed.

Comparative Example D5

1000 pieces/m² of holes having an average diameter of 50 μm were continuously provided, by using a laser, in a biaxially-oriented polypropylene film having a thickness of 30 μm (manufactured by TOHCELLO Co., Ltd.) whose one surface can be heat sealed. Printing was then conducted on the film provided with the holes.

Comparative Example D6

A biaxially-oriented polypropylene film having a thickness of 30 μm (manufactured by TOHCELLO Co., Ltd.) whose one surface can be heat sealed was used without providing holes.

Comparative Example D7

100 pieces/m² of holes having an average diameter of 150 μm were continuously provided, by using a heated needle, in a linear-low-density polyethylene film (LLDPE) having a thickness of 30 μm ("TOHCELLO TUX" manufactured by TOHCELLO Co., Ltd.).

Test Example D1

The oxygen and carbonic acid gas transmission rates at 23° C. of each of the inventive films of Examples D1 to D4 and the films of Comparative Examples D1 to D6 were measured. The results are shown in Table D1.

As the data of Examples D1 to D4 clearly demonstrate, the films of Examples D1 to D4 have oxygen transmission rates higher than that of the single film having no hole, and are free from clogging with dusts or the like. Therefore, it is possible to freely control the oxygen and carbonic acid transmission rates by changing the number of holes to be provided. The oxygen and carbonic acid gas transmission rates were in proportional to the number of the holes. Moreover, even in the case where printing was conducted after the holes were provided in the film, the gas transmission rate was unchanged.

By contrast, the diameter of the holes provided in Comparative Example D1 is too large, so that the oxygen and carbonic acid gas transmission rates were high. These rates were unsuitable to an MA packaging film. Further, as is clear from Comparative Examples D2 to D5, those films which were provided with holes having a diameter of 50 μm had low oxygen and carbonic acid gas transmission rates because a part of the holes were clogged with dusts or wastes which were produced when the holes were provided in the films; and the oxygen and carbonic acid gas transmission rates also varied widely. Moreover, no proportional relation was found between the number of the holes and the oxygen and carbonic acid gas transmission rates. In addition, in the case where printing was conducted, a part of the holes was clogged with a printing ink, so that the oxygen and carbonic acid gas transmission rates of the film were found to be lower than those of the film before the printing was conducted.

TABLE D1

| | | | | Oxygen Transmission Rate of Film (cc/m² · 24 hrs · atm) | | |
|---|---|---|---|---|---|---|
| | Average Diameter of Holes (μm) | Number of Holes (pieces/m2) | Printing | Oxygen Transmission Rate | Carbonic Acid Gas Transmission Rate | Clogging in Holes |
| Example D1 | 150 | 50 | none | 1200 | 15400 | none |
| Example D2 | 150 | 100 | none | 24100 | 27500 | none |
| Example D3 | 150 | 200 | none | 48000 | 51400 | none |
| Example D4 | 150 | 200 | conducted | 48000 | 51400 | none |
| Comparative Example D1 | 500 | 50 | none | 125000 | 128000 | none |

TABLE D1-continued

| | Oxygen Transmission Rate of Film (cc/m² · 24 hrs · atm) | | | | | |
|---|---|---|---|---|---|---|
| | Average Diameter of Holes (μm) | Number of Holes (pieces/m2) | Printing | Oxygen Transmission Rate | Carbonic Acid Gas Transmission Rate | Clogging in Holes |
| Comparative Example D2 | 50 | 250 | none | 6000 | 9500 | clogged |
| Comparative Example D3 | 50 | 500 | none | 7800 | 11200 | clogged |
| Comparative Example D4 | 50 | 1000 | none | 9200 | 12500 | clogged |
| Comparative Example D5 | 50 | 1000 | conducted | 7800 | 11200 | clogged |
| Comparative Example D6 | — | 0 | none | 1600 | 5000 | — |

Test Example D2

Pouches each having an inner size of 200 mm×150 mm and a surface area of 0.06 m² were prepared by using the films of Example D2 and Comparative Examples D1, D4 and D6. 200 g of shiitake was packed in each of these pouches. The pouches were sealed, and preserved at 20° C. for 5 days. Thereafter, the composition of gas in each pouch was determined, and a change in the quality of the shiitake was also observed. The results are shown in Table D2.

As the data shown in Table D2 clearly demonstrate, the pouch of Example D2 can keep the oxygen concentration therein optimum, so that this pouch is effective to prevent the shiitake packed therein from browning and withering. In addition, the shiitake did not emit an offensive odor which is caused when the oxygen concentration is low. By contrast, the oxygen concentration in the pouch of Comparative Example D1 was high, so that the shiitake packed in this pouch browned. Further, in the film of Comparative Example D4, a part of the holes provided therein were clogged with dusts or very small wastes of the shiitake which were produced when the packaging was conducted, so that the oxygen concentration in the pouch became too low. For this reason, the shiitake packed in this pouch, as well as the shiitake in Comparative Example D6, emitted an offensive odor.

TABLE D2

| | Oxygen Concentration (%) in Pouch and Quality of Shiitake (after 20° C. × 5 days) | | | | |
|---|---|---|---|---|---|
| | Oxygen Concentration (%) | Quality of Shiitake | | | Commercial Value |
| | | Offensive Odor | Browning | Withering | |
| Example D2 | 3.4 | ○ | ○ | ○ | ⊙ |
| Comparative Example D1 | 18.9 | ○ | X | Δ | ○ |
| Comparative Example D4 | 0.5 | X | ○ | ○ | X |
| Comparative Example D6 | 0.1 | X | ○ | ○ | X |
| Non-packed | — | ○ | X | X | Δ |

Test Example D3

Pouches each having an inner size of 300 mm×400 mm and a surface area of 0.24 m² were prepared by using the films of Example D1 and Comparative Examples D1, D4 and D6. 1 kg of cut lettuce was packed in each of these pouches. The pouches were sealed, and preserved at 10° C. for 3 days. Thereafter, the composition of gas in each pouch was determined, and a change in the quality of the cut lettuce was also observed. The results are shown in Table D3.

As the data shown in Table D3 clearly demonstrate, the pouch of Example D1 can keep the oxygen concentration therein optimum, so that this pouch is effective to prevent the cut lettuce packed therein from browning and withering. In addition, the cut lettuce did not emit an offensive odor which is caused when the oxygen concentration is low. By contrast, the oxygen concentration in the pouch of Comparative Example D1 was high, so that the lettuce packed in this pouch browned. Further, in the film of Comparative Example D4, a part of the holes provided therein were clogged with dusts or very small wastes of the cut lettuce which were produced when the packaging was conducted, so that the oxygen concentration in the pouch became too low. For this reason, the cut lettuce packed in this pouch, as well as the cut lettuce in Comparative Example D6, emitted an offensive odor.

TABLE D3

| | Oxygen Concentration (%) in Pouch and Quality of Cut Lettuce (after 10° C. × 3 days) | | | | |
|---|---|---|---|---|---|
| | Oxygen Concentration (%) | Quality of Cut Lettuce | | | Commercial Value |
| | | Offensive Odor | Browning | Withering | |
| Example D1 | 1.6 | ○ | ○ | ○ | ⊙ |
| Comparative Example D1 | 15.5 | ○ | X | ○ | Δ |
| Comparative Example D4 | 0.2 | X | ○ | ○ | X |
| Comparative Example D6 | 0.1 | X | ○ | ○ | X |
| Non-packed | — | ○ | X | X | Δ |

Test Example D4

The oxygen transmission rates and the water vapor permeabilities of the films of Examples D2 and D5 were measured. The results are shown in Table D4. As the date shown in Table D4 clearly demonstrate, the film of Example D5 has a water vapor permeability suitable for the MA packaging of vegetables and fruits having a high transpiration rate. This film has also a proper oxygen transmission rate.

TABLE D4

| | Oxygen Transmission Rate & Water Vapor permeability | |
|---|---|---|
| | Oxygen Transmission Rate (at 23° C.) (cc/m² · 24 hrs · atm) | Water Vapor Permeability (at 40° C. and 90 RH %) (g/m² · 24 hrs · atm) |
| Example D2 | 24100 | 4 |
| Example D5 | 26000 | 150 |
| Comparative Example D7 | 27600 | 20 |

Test Example D5

Pouches each having a size of 210 mm×300 mm were prepared by using the films of Examples D2 and D5 and Comparative Example D7. A piece of broccoli was placed in each of these pouches. The pouches were sealed, and preserved at 20° C. for 7 days. Thereafter, the composition of gas in each pouch was determined, and a change in the quality of the broccoli was observed. The results are shown in Table D5. As the date shown in Table D5 clearly demonstrate, the pouches of Examples D2 and D5 can keep the oxygen concentration therein optimum. Moreover, these pouches can prevent the broccoli packed therein from getting moldy and corruption owing to the proper transpiration. They are thus possible to extend the period during which the freshness of the broccoli packed therein is retained.

TABLE D5

| | Oxygen Concentration (%) in Pouch and Quality of Broccoli | | | | | Rate of Decrease in Weight (%) |
|---|---|---|---|---|---|---|
| | 20° C. × 3 days | | 20° C. × 5 days | | 20° C. × 7 days | |
| | O₂ | Quality | O₂ | Quality | O₂ | Quality | |
| Example D2 | 4.1 | good | 3.9 | good | 3.7 | got moldy, corrupted | 2.3 |
| Example D5 | 4.5 | good | 4.2 | good | 4.1 | good | 6.8 |
| Comparative Example D7 | 4.5 | good | 4.1 | good | 4.0 | got moldy, corrupted | 2.5 |

Since the present invention has the above-described structure, the MA packaging of vegetables and fruits can be attained by means of airtight packaging using any film material. The package of the present invention can therefore prevent vegetable or fruit packed therein from losing its freshness over a prolonged period of time, so that it is extremely advantageous from the industrial point of view. Further, by the use of a film having a proper water vapor permeability, the MA packaging of vegetables and fruits having a high transpiration rate can also be attained. In addition, the period during which the freshness of the content of the package is retained can be further extended.

Example E1

Figure 3:
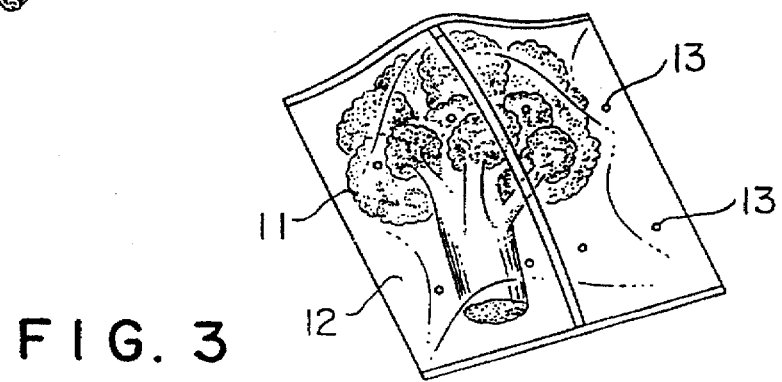
FIG. 3 is an illustration showing one example of the airtight package of fresh plant (broccoli) according to the present invention (the invention of group E).

A packaging film 12 for use in the embodiment of the present invention shown in FIG. 3 was prepared in the following manner. Namely, 150 pieces/m² of minute holes 13 having an average diameter of 140 μm were continuously provided by the use of a heated needle, by properly controlling the distance between the holes, in a biaxially-oriented polypropylene film having a thickness of 30 μm (manufactured by TOHCELLO Co., Ltd.) whose one surface can be heat sealed, and which was provided with an antifogging treatment.

Comparative Example E1

30 pieces/m² of minute holes having an average diameter of 140 μm were continuously provided by the use of a heated needle, by properly controlling the distance between the holes, in the same film as in Example E1.

Comparative Example E2

750 pieces/m² of minute holes having an average diameter of 140 μm were continuously provided by the use of a heated needle, by properly controlling the distance between the holes, in the same film as in Example E1.

Comparative Example E3

The same film as in Example E1 was used without providing holes therein.

Test Example E1

The oxygen transmission rates at 23° C. per centiare of the films of Example E1 and Comparative Examples E1 to E3 were measured. The results are shown in Table E1.

As the data shown in Table E1 clearly demonstrate, the film of Example E1 has oxygen and carbonic gas acid transmission rates suitable for packing broccoli 11 at the normal temperature.

TABLE E1

| | Oxygen and Carbonic Acid Gas Transmission Rates at 23° C. of Film (cc/m² · 24 hrs · atm) | |
|---|---|---|
| | Oxygen Transmission Rate | Carbonic Acid Gas Transmission Rate |
| Example E1 | 31600 | 35000 |
| Comparative Example E1 | 7800 | 11000 |
| Comparative Example E2 | 151600 | 155000 |
| Comparative Example E3 | 1600 | 5000 |

Test Example E2

Pouches each having an outer size of 210 mm×300 mm and an inner surface area of 0.1 m² were prepared by using the films of the above Example E1 and Comparative Example E1 to E3. A piece of broccoli was packed in each one of these pouches. The pouches were sealed, and preserved at 25° C. for 3 days. Thereafter, the composition of gas in each pouch was determined, and a change in the quality of the broccoli was visually and organoleptically observed. In addition, a change in the Vitamin C content of the broccoli was also determined. The results are shown in Tables E2 and E3.

TABLE E2

Oxygen and Carbonic Acid Gas Concentrations
(%) in Pouch and Quality of Broccoli (after 25° C. × 3 days)

|  | Oxygen Concentration | Carbonic Acid Gas Concentration | Appearance of Broccoli | | | |
| --- | --- | --- | --- | --- | --- | --- |
|  |  |  | Yellowing | Offensive Odor | Withering | Commercial Value |
| Example E1 | 6.2 | 15.7 | o | o | o | ⊚ |
| Comparative Example E1 | 0.86 | 37.1 | o | X | o | X |
| Comparative Example E2 | 17.6 | 2.9 | X | o | o | o |
| Comparative Example E3 | 0.02 | 45.0 | o | X | o | X |
| Non-packed | — | — | X | o | X | X |

TABLE E3

Change in Vitamin C Content (mg/100 g)

|  | 1st day | 3rd day (25° C.) |
| --- | --- | --- |
| Example E1 |  | 116.24 |
| Comparative Example E1 |  | 97.40 |
| Comparative Example E2 | 141.87 | 35.22 |
| Comparative Example E3 |  | 88.40 |
| Non-packed |  | 28.61 |

As the date shown in Table E2 clearly demonstrate, the pouch of Example E1 can keep the oxygen concentration therein low and the carbonic acid gas concentration therein high. Therefore, this pouch is effective to prevent the broccoli packed therein from yellowing, and the broccoli did not emit an offensive odor which is caused when the oxygen concentration is excessively low. By contrast, the oxygen concentration in the pouch of Comparative Example E2 was high, so that the broccoli packed therein yellowed. Further, in the case of Comparative Examples E1 and E3, since the inside of the pouches became an excessively low-oxygen, high-carbonic acid gas state, the broccoli packed therein emitted an offensive odor, and lost its commercial value. Furthermore, as the date shown in Table E3 clearly demonstrate, the rate of decrease of the Vitamin C content of the broccoli packed in the pouch of Example E1 is smaller than that of the non-packed broccoli or of the broccoli packed in any one of the pouches of Comparative Examples.

Example E2

80 pieces/m$^2$ of minute holes having an average diameter of 140μ, were continuously provided by the use of a heated needle, by properly controlling the distance between the holes, in a non-oriented polystyrene film having a thickness of 30 μm (manufactured by Toko Shizai Kogyo Kabushiki Kaisha).

Comparative Example E4

30 pieces/m$^2$ of minute holes having an average diameter of 140 μm were continuously provided by the use of a heated needle, by properly controlling the distance between the holes, in the same film as in Example E2.

Comparative Example E5

750 pieces/m$^2$ of minute holes having an average diameter of 140 μm were continuously provided by the use of a heated needle, by properly controlling the distance between the holes, in the same film as in Example E2.

Comparative Example E6

The same film as in Example E2 was used without providing holes therein.

Comparative Example E7

A porous-mineral mixed LLDPE film having a thickness of 40 μm was used.

As the date shown in Table E4 clearly demonstrate, the film of Example E2 has oxygen and carbonic acid gas transmission rates suitable for packaging broccoli at room temperature.

TABLE E4

Oxygen and Carbonic Acid Gas Transmission Rates
at 23° C. (cc/m$^2$ · 24 hrs · atm) and Water Vapor
Permeability at 23° C. (g/m$^2$ · 24 hrs) of Film

|  | Oxygen Transmission Rate | Carbonic Acid Gas Transmission Rate | Water Vapor Permeability |
| --- | --- | --- | --- |
| Example E2 | 38700 | 56100 | 159 |
| Comparative Example E4 | 6200 | 18100 | 153 |
| Comparative Example E5 | 158700 | 162100 | 172 |
| Comparative Example E6 | 8700 | 26100 | 150 |
| Comparative Example E7 | 5600 | 16800 | 9 |

Test Example E3

Pouches each having an outer size of 210 mm×300 mm and an inner surface area of 0.1 m$^2$ were prepared by using the films of Example E2 and Comparative Examples E4 to E7. A piece of broccoli was packed in each one of these pouches, and the pouches were sealed. 12 packages were prepared by using each type of the pouches. They were placed in a corrugated fiberboard box, and preserved at 25° C. for 3 days. Thereafter, the composition of gas in each pouch was determined, and changes in the appearance and the quality of the broccoli were visually and organoleptically observed. The results are shown in Table E5.

TABLE E5

Oxygen and Carbonic Acid Gas Concentrations (%)
in Pouch and Quality of Broccoli (after 25° C. × 3 days)

| | Oxygen Concentration | Carbonic Acid Gas Concentration | Appearance & Quality of Broccoli | | | |
|---|---|---|---|---|---|---|
| | | | Color | Offensive Odor | Withering | Commercial Value |
| Example E2 | 5.1 | 8.1 | o | o | o | o |
| Comparative Example E4 | 1.9 | 3.2 | o | X | o | X |
| Comparative Example E5 | 17.6 | 2.9 | X | o | o | X |
| Comparative Example E6 | 0.86 | 17.0 | o | X | o | X |
| Comparative Example E7 | 12.4 | 7.5 | X | X | o | X |
| Non-packed | — | — | X | o | X | X |

(Color)
o: Kept green color, good
X: Yellowed
(Offensive Odor)
o: Emitted no offensive odor
X: Emitted offensive odor
(Withering)
o: Not withered, good
X: withered
(Commercial Value)
o: Kept commercial value
X: Lost commercial value As the date shown in Table E5 clearly demonstrate, the pouch of Example E2 can keep the oxygen concentration therein low and the carbonic acid gas concentration therein high. Therefore, this pouch is effective to prevent the broccoli packed therein from yellowing. Moreover, the package has a high water vapor permeability, so that the broccoli was prevented from being corrupted, getting moldy and withering, and its quality was kept high. By contrast, the oxygen concentrations in the pouches of Comparative Examples E4 and E6 were extremely low, and the carbonic acid gas concentrations thereof also extremely high. For this reason, the broccoli in Comparative Examples E4 and E6 got moldy, and the cut surface thereof was corrupted. In addition, the broccoli emitted an offensive odor, and lost its commercial value. In Comparative Example E5 and the non-packed experimental plot, the broccoli yellowed because the oxygen concentration was high.

Since the present invention has the above-explained structure, freshness-retaining packaging of broccoli attained by means of the MA packaging, useful for the distribution thereof at the normal temperature can be attained, and the broccoli can be prevented from losing its freshness from the step of distribution to the steps of selling and consumption. The present invention is thus very advantageous from the industrial point of view.

Example F1

A non-oriented polystyrene film having a thickness of 30 µm was prepared by the conventionally known inflation method, and a pouch having a size of 200 mm×150 mm was made by the use of this film.

Example F2

A non-oriented polystyrene film having a thickness of 30 µm was prepared by the conventionally known inflation method, and minute holes having an average diameter of 150 µm were provided by using a heated needle in this film so that 4 pieces of the holes would exist in one pouch which will be made later. A pouch having a size of 200 mm×150 mm was made by the use of this film.

Comparative Example F1

A pouch having a size of 200 mm×150 mm was made by the use of a biaxially-oriented polypropylene film having a thickness of 30 µm whose one surface can be heat sealed.

Comparative Example F2

Minute holes having an average diameter of 150µm were provided by using a heated needle in a biaxially-oriented polypropylene film having a thickness of 30 µm whose one surface can be heat sealed so that 4 pieces of the holes would exist in one pouch which will be made later. A pouch having a size of 200 mm×150 mm was made by the use of this film.

Test Example F1

The oxygen transmission rates and the water vapor permeabilities of the inventive pouch of Example F1 and the pouches of Comparative Examples F1 and F2 were measured. The results are shown in Table F1 (the values obtained were converted to values per $m^2$). As the data shown in Table E1 clearly demonstrate, the film of Example F1 has a water vapor permeability suitable for the MA packaging of mushrooms. It has also a proper oxygen transmission rate. By contrast, both the oxygen transmission rate and the water vapor permeability are insufficient in Comparative Example F1. Further, although the oxygen transmission rate is in a proper range, the water vapor permeability is lacking in Comparative Example F2.

TABLE F1

Oxygen Transmission Rate and Water Vapor
Permeability of Package

| | Oxygen Transmission Rate (at 23° C.) (cc/$m^2$ · 24 hrs · atm) | Water Vapor Permeability (at 40° C. and 90 RH %) (g/$m^2$ · 24 hrs · atm) |
|---|---|---|
| Example F1 | 7000 | 150 |
| Example F2 | 20000 | 150 |

TABLE F1-continued

| | Oxygen Transmission Rate and Water Vapor Permeability of Package | |
|---|---|---|
| | Oxygen Transmission Rate (at 23° C.) (cc/m² · 24 hrs · atm) | Water Vapor Permeability (at 40° C. and 90 RH %) (g/m² · 24 hrs · atm) |
| Comparative Example F1 | 1600 | 4 |
| Comparative Example F2 | 15000 | 4 |

Test Example F2

100 g of honshimeji was placed in each of 20 pouches prepared by using each one of the films of Example F1 and Comparative Examples F1 and F2. These pouches were sealed by means of impulse sealing, and preserved at 22° C. for 7 days. Thereafter, the composition of gas in each pouch was determined, and a change in the quality of the honshimeji was observed. They were also compared with Comparative Example F3 which was an airtight package of honshimeji obtained by covering an expanded polystyrene tray, which is commonly used in these days, with a stretched film of soft polyvinyl chloride. The results are shown in Table F2. As the data shown in Table F2 clearly demonstrate, the pouch of Example F1 can keep the oxygen concentration therein optimum. This pouch is thus effective for preventing the honshimeji packed therein from being corrupted and undergoing the growth of aerial mycels. Moreover, the honshimeji did not emit an offensive odor which is caused when the oxygen concentration is excessively low.

By contrast, the honshimeji packed in the pouch of Comparative Example E1 emitted an offensive odor because the oxygen concentration in this package became low. Although the honshimeji packed in the pouch of Comparative Example F2 did not emit an offensive odor, water gathered in the pouch, and the honshimeji was softened and corrupted. The honshimeji thus drastically lost its freshness. Further, in Comparative Example F3, 3 out of 20 pouches tested were poor in sealing, so that the growth of mycels was found. Thus, the honshimeji packed in these pouches lost its commercial value.

TABLE F2

Oxygen Concentrations (%) in Pouch and Quality of Honshimeji (n = 20, preserved at 22° C. for 7 days)

| | Oxygen Concentration (%) | Quality of Honshimeji | | | |
|---|---|---|---|---|---|
| | | Growth of Mycels | Softening, Corruption | Offensive Odor | Commercial Value |
| Example F1 | 6.07 | o | o | o | o |
| Comparative Example F1 | 0.001 or less | o | X | X | X |
| Comparative Example F2 | 0.05 | o | X | o | Δ |
| Comparative Example F3 | 0.01 to 10.0 | o–Δ | X | Δ | o |

The film constituting the package of mushroom according to the present invention is characterized in that the film has an oxygen transmission rate at 23° C. in the range of 3000 to 30000 cc/m²·24 hrs·atm and a water vapor permeability at 40° C. in the range of 50 to 200 g/m²·24 hrs·atm, that the innermost surface of the film is provided with an anti-fogging treatment, and that the film has heat-sealing properties. When mushrooms are packed in a pouch prepared by using this film and the pouch is sealed, the freshness-retaining effect can be enhanced as compared with a package obtained by means of the conventional tray-stretch packaging. In addition, many other effects can be obtained as follows: the MA effect is stabilized because of the improved sealing-properties; the productivity is improved because high-speed filling packaging can be conducted; the transparency of the film can be enhanced by providing an anti-fogging treatment; and the packaging material can be conveniently discarded because no tray is used.

We claim:

1. A non-airtight fold package for packaging a fresh plant comprising:

a bag made of a substantially imperforate plastic film comprising 50 to 100% by weight of a styrene-butadiene block copolymer and having a water vapor permeability at 40° C. and 90 RH % of 50 to 300 g/m²·24 hrs; and a container composed of corrugated fiberboard in which the bag is placed, so that the oxygen concentration in the bag placed in the container is controlled to an amount of 2 to 10 vol. %.

2. A non-airtight packaging film for packaging a fresh plant comprising:

a substantially imperforate plastic film comprising 50 to 100% by weight of a styrene-butadiene block copolymer, and having a water vapor permeability at 40° C. and 90 RH % of 50 to 300 g/m²·24 hrs.

3. The packaging film according to claim 2, wherein the fresh plant is broccoli or cauliflower.

4. A package of fresh plant obtained by packaging a fresh plant in a bag prepared by using a packaging film according to claim 2, by means of non-airtight packaging, and controlling the oxygen concentration in the bag to 2 to 10 vol. %.

5. An assemblage for packaging and transporting a fresh plant comprising:

a packaging film made of a substantially imperforate plastic film comprising 50 to 100% by weight of a styrene-butadiene block copolymer and having a water vapor permeability at 40° C. and 90 RH % of 50 to 300 g/m²·24 hrs; and a container in which a package obtained by the packaging film is placed for transportation.

6. A method of retaining freshness of fresh plants in a non-airtight fold packaging, comprising the steps of:

packaging a fresh plant in a bag made of a substantially imperforate plastic film comprising 50 to 100% by weight of a styrene-butadiene block copolymer and having a water vapor permeability at 40° C. and 90 RH % of 50 to 300 g/m²·24 hrs;

placing the bag in a container composed of corrugated fiberboard; and controlling the oxygen concentration in the bag placed in the container to 2 to 10 vol. % so as to suppress respiration and retain freshness of the fresh plant.

7. The method according to claim 6, wherein the fresh plant is broccoli or cauliflower.

8. A method of packaging a fresh plant in a non-airtight package comprising the steps of:

entirely wrapping a piece of fresh plant in a substantially imperforate plastic film comprising 50 to 100% by weight of a styrene-butadiene block copolymer and having a water vapor permeability at 40° C. and 90 RH % of 50 to 300 g/m²·24 hrs;

turning up or twisting an end portion of the film to obtain a non-airtight package; and controlling the oxygen concentration in the bag placed in the container to 2 to 10 vol. %.

9. The unit package according to claim 8, wherein the fresh plant is broccoli or cauliflower.

10. A method of retaining freshness of fresh plants comprising the steps of:

entirely wrapping a piece of fresh plant in a substantially imperforate plastic film comprising 50 to 100% by weight of a styrene-butadiene block copolymer and having a water vapor permeability at 40° C. and 90 RH % of 50 to 300 g/m$^2$·24 hrs; and controlling the oxygen concentration in the bag placed in the container to 2 to 10 vol. %.

11. The method according to claim 10, wherein the fresh plant is broccoli or cauliflower.

12. A method of packaging a fresh plant having a stalk part and a flower bud part, in a non-airtight package comprising the steps of:

wrapping a part of the stalk part and the entire flower bud part of a fresh plant having a stalk part and a flower bud part in a substantially imperforate plastic film comprising 50 to 100% by weight of a styrene-butadiene block copolymer and having a water vapor permeability at 40° C. and 90 RH % of 50 to 300 g/m$^2$·24 hrs;

fixing the plastic film at a point on the stalk part of the fresh plant to obtain a non-airtight package; and controlling the oxygen concentration in the bag placed in the container to 2 to 10 vol. %.

13. The package of fresh plant having a stalk part and a flower bud apart according to claim 12, wherein the fresh plant is broccoli or cauliflower.

14. A method of retaining freshness of fresh plant having a stalk part and a flower bud part, in a non-airtight package comprising the steps of:

wrapping a part of the stalk part and the entire flower bud part of a fresh plant having a stalk part and a flower bud part in a substantially imperforate plastic film comprising 50 to 100% by weight of a styrene-butadiene block copolymer and having a water vapor permeability at 40° C. and 90 RH % of 50 to 300 g/m$^2$·24 hrs;

fixing the plastic film at a point on the stalk part of the fresh plant to obtain a non-airtight package; and controlling the oxygen concentration in the bag placed in the container to 2 to 10 vol. % so as to suppress respiration and retain freshness of the fresh plant.

15. The method according to claim 14, wherein the fresh plant is broccoli or cauliflower.

16. The package according to claim 1, wherein the fresh plant is broccoli or cauliflower.

* * * * *